United States Patent
Yonekura et al.

(10) Patent No.: US 7,209,768 B2
(45) Date of Patent: Apr. 24, 2007

(54) CONNECTION UNIT RADIO COMMUNICATION SYSTEM CONTROL METHOD OF CONNECTION UNIT AND RADIO COMMUNICATION METHOD

(75) Inventors: Takaomi Yonekura, Hamura (JP); Shoichi Nagatomo, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 136 days.

(21) Appl. No.: 10/471,298

(22) PCT Filed: Mar. 7, 2002

(86) PCT No.: PCT/JP02/02138

§ 371 (c)(1),
(2), (4) Date: Sep. 8, 2003

(87) PCT Pub. No.: WO02/071733

PCT Pub. Date: Sep. 12, 2002

(65) Prior Publication Data

US 2004/0110474 A1    Jun. 10, 2004

(30) Foreign Application Priority Data

Mar. 7, 2001 (JP) .............................. 2001-63175
Feb. 20, 2002 (JP) .............................. 2002-42980

(51) Int. Cl.
*H04B 1/38* (2006.01)
(52) U.S. Cl. ................ 455/557; 455/556.1; 455/552.1
(58) Field of Classification Search ............ 455/575.3, 455/90, 557, 414.1, 348; 348/14.01, 14.02; 379/433.13
See application file for complete search history.

(56) References Cited

U.S. PATENT DOCUMENTS 5,491,507 A * 2/1996 Umezawa et al. ....... 348/14.02
6,009,336 A * 12/1999 Harris et al. ................ 455/566
6,392,697 B1 * 5/2002 Tanaka et al. ........... 348/220.1

(Continued)

FOREIGN PATENT DOCUMENTS

JP    08-070340 A    3/1996

(Continued)

OTHER PUBLICATIONS

Second Office Action mailed Aug. 11, 2006 from Chinese Patent Office in counterpart Chinese patent application and English translation thereof.

*Primary Examiner*—Temica Beamer
*Assistant Examiner*—Joy Contee
(74) *Attorney, Agent, or Firm*—Frishauf, Holtz, Goodman & Chick, P.C.

(57) ABSTRACT

When an attachment 3 is connected to a connector of a cellular phone terminal 4, the communication system of the relevant cellular phone terminal 4 is judged and image data received from the digital camera 2 is converted to a format along the judged communication system of the relevant cellular phone terminal 4. Accordingly, even if the cellular phone terminal 4 to which the attachment 3 is connected uses any communication system, this can be used for the general purpose, and data received from the digital camera 2 is converted to the format along the communication system of the connected cellular phone terminal 4 to make it possible to upload it to the server via WWW7.

15 Claims, 31 Drawing Sheets

U.S. PATENT DOCUMENTS 6,567,661 B2 * 5/2003 McDonnell et al. ... 340/870.07
6,600,510 B1 * 7/2003 Parulski et al. .......... 348/211.2
6,690,417 B1 * 2/2004 Yoshida et al. .......... 348/231.1

FOREIGN PATENT DOCUMENTS

| | | |
|---|---|---|
| JP | 08-214344 A | 8/1996 |
| JP | 08-223346 A | 8/1996 |
| JP | 10-126564 A | 5/1998 |
| JP | 2000-049913 A | 2/2000 |
| JP | 2000-184104 A | 6/2000 |
| JP | 3071604 U | 6/2000 |
| WO | WO 00/61252 A1 | 10/2000 |

* cited by examiner

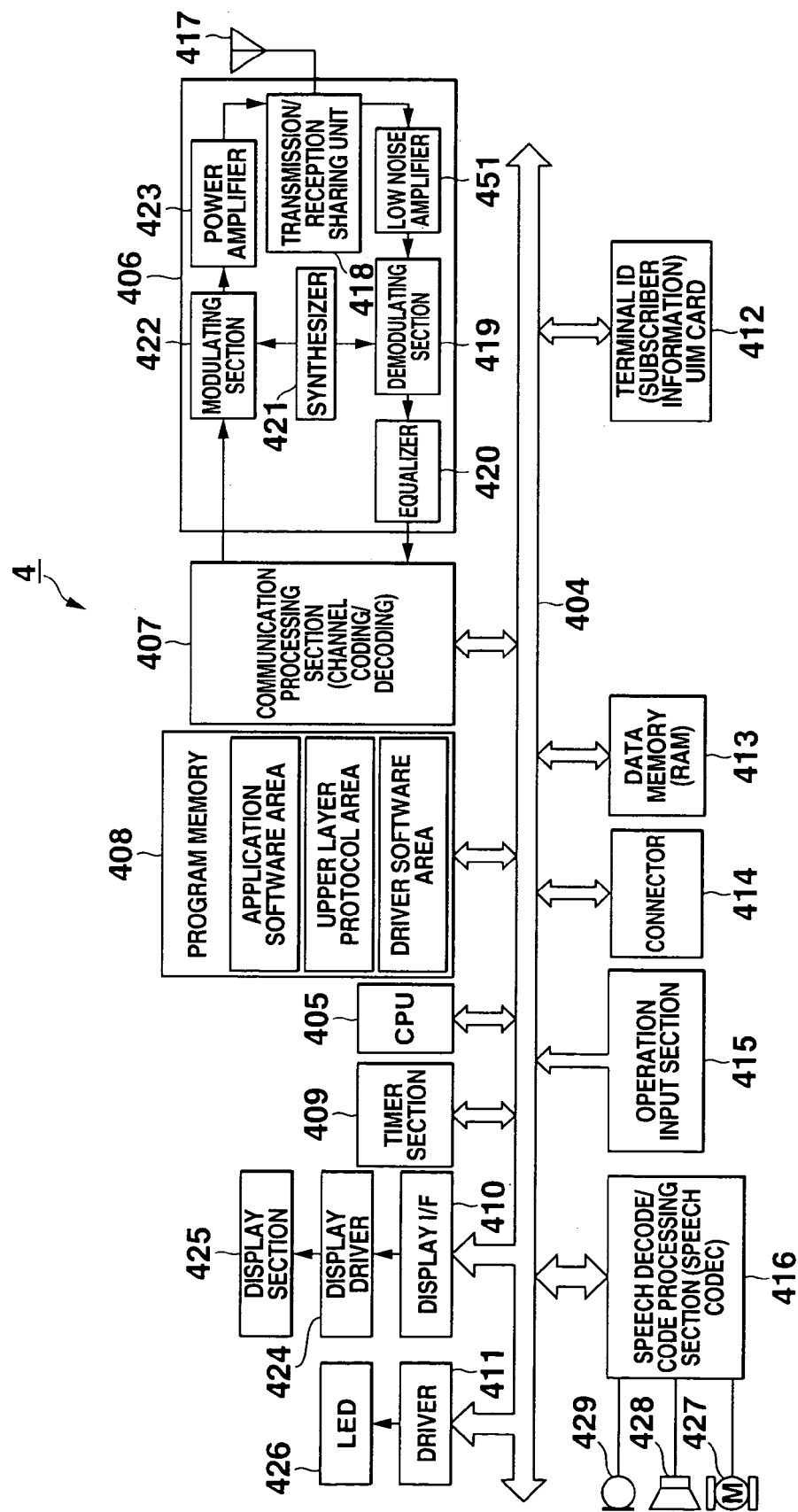

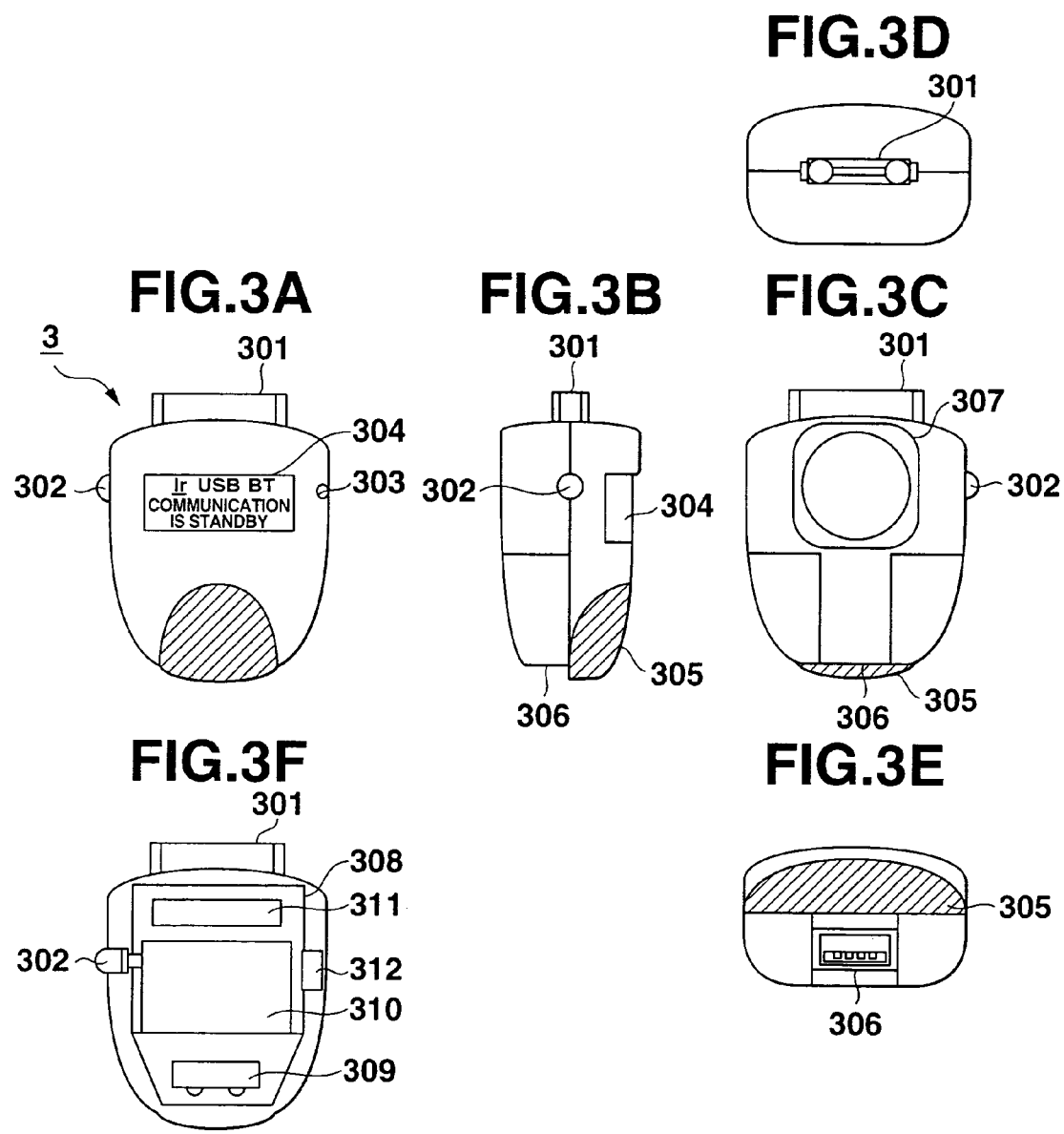

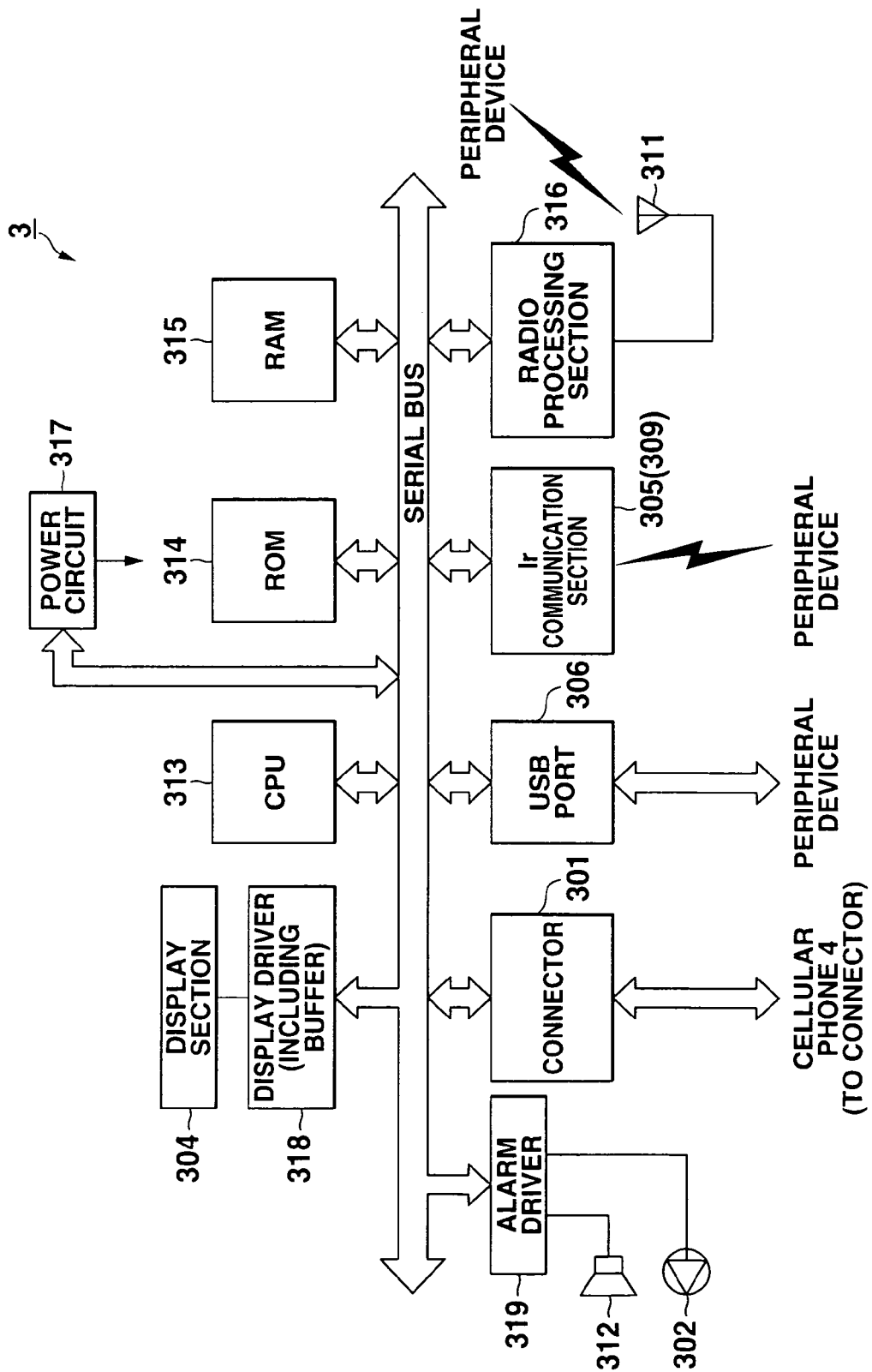

FIG.5

| | |
|---|---|
| DEVICE ID MEMORY (FOR SHORT-RANGE RADIO COMMUNICATION (Bluetooth SYSTEM)) | 3140 |
| RGB DATA⇔GIF FILE CONVERSION APPLICATION PROGRAM | 3141 |
| RGB DATA⇔JPEG FILE CONVERSION APPLICATION PROGRAM | 3142 |
| RGB DATA⇔PNG FILE CONVERSION APPLICATION PROGRAM | 3143 |
| Ir COMMUNICATION DRIVER IrMC, IrDA STANDARD (SOFTWARE) | 3144 |
| Ir COMMUNICATION DRIVER/ OTHER SUPPORT (SOFTWARE) | 3145 |
| USB COMMUNICATION DRIVER (SOFTWARE) | 3146 |
| SHORT-RANGE RADIO COMMUNICATION (Bluetooth SYSTEM) DRIVER (SOFTWARE) | 3147 |
| PROTOCOL SETTING DATA 1 FOR CELLULAR PHONE DATA COMMUNICATION | 3148 |
| PROTOCOL SETTING DATA 2 FOR CELLULAR PHONE DATA COMMUNICATION | 3149 |
| PROTOCOL SETTING DATA 3 FOR CELLULAR PHONE DATA COMMUNICATION | 3150 |
| CONVERSION APPLICATION PROGRAM FOR VARIOUS DATA | 3151 |

CELLULAR RECEIVE

CELLULAR
RECEIVE

CELLULAR SEND

CELLULAR SEND

NG

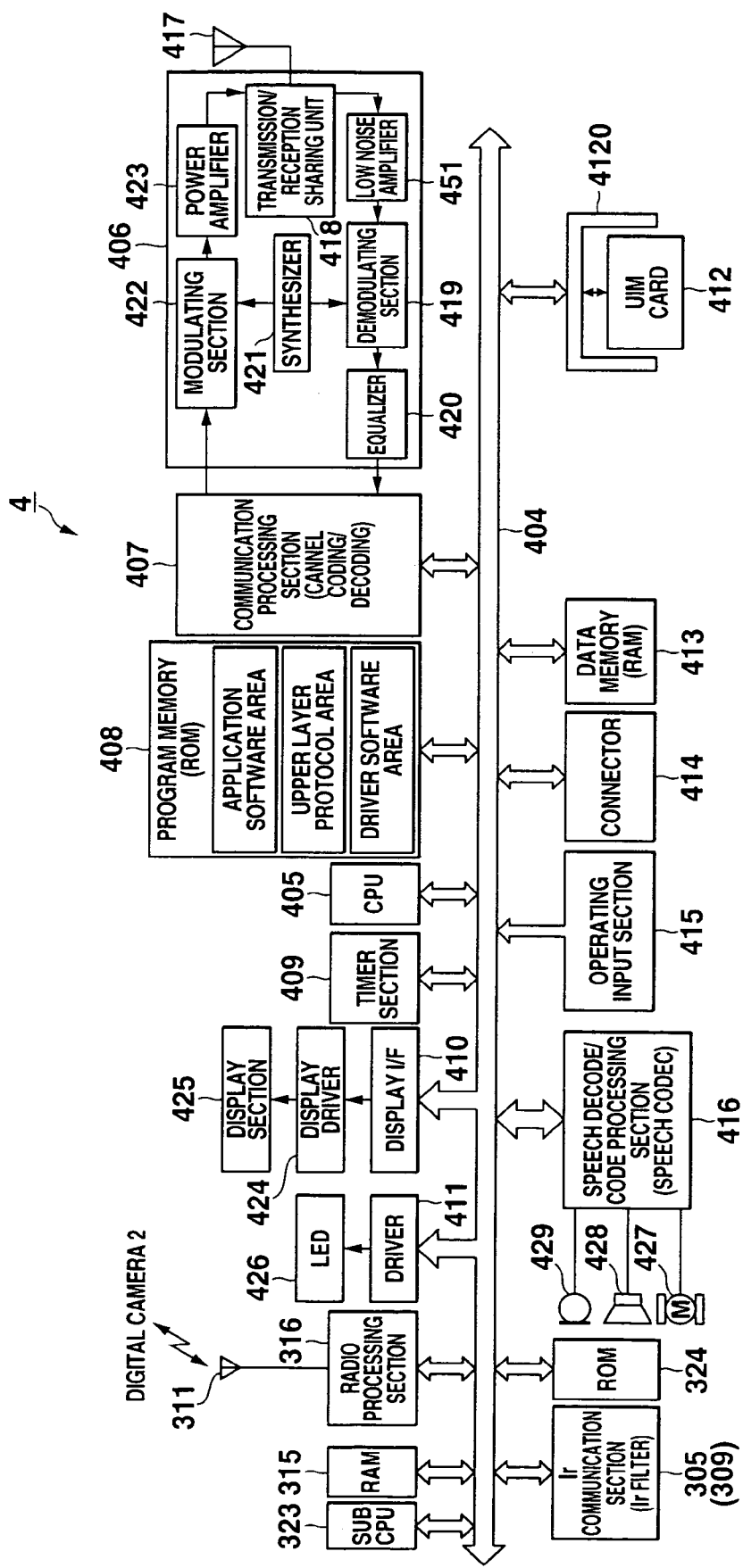

FIG.26

| | |
|---|---|
| DEVICE ID MEMORY (FOR SHORT-RANGE RADIO COMMUNICATION (Bluetooth SYSTEM)) | ~3140 |
| JPEG FILE⇔GIF FILE CONVERSION APPLICATION PROGRAM | ~3241 |
| JPEG FILE⇔PNG FILE CONVERSION APPLICATION PROGRAM | ~3242 |
| Ir COMMUNICATION DRIVER IrMC, IrDA STANDARD (SOFTWARE) | ~3144 |
| Ir COMMUNICATION DRIVER/ OTHER SUPPORT (SOFTWARE) | ~3145 |
| USB COMMUNICATION DRIVER (SOFTWARE) | ~3146 |
| SHORT-RANGE RADIO COMMUNICATION (Bluetooth SYSTEM) DRIVER (SOFTWARE) | ~3147 |
| PROTOCOL SETTING DATA 1 FOR CELLULAR PHONE DATA COMMUNICATION | ~3248 |
| PROTOCOL SETTING DATA 2 FOR CELLULAR PHONE DATA COMMUNICATION | ~3249 |
| PROTOCOL SETTING DATA 3 FOR CELLULAR PHONE DATA COMMUNICATION | ~3250 |
| CONVERSION APPLICATION PROGRAM FOR VARIOUS DATA | ~3151 |

324

CONNECTION UNIT RADIO COMMUNICATION SYSTEM CONTROL METHOD OF CONNECTION UNIT AND RADIO COMMUNICATION METHOD

This application is a U.S. National Phase Application under 35 U.S.C. 371 of International Application PCT/JPL02/02138, filed Mar. 7, 2002.

TECHNICAL FIELD

The present invention relates to a connection unit attachably and detachably connected to a connector provided in a portable radio communication device such as a cellular phone terminal and the like, a radio communication system composed of a portable radio communication device and an outer device, a control method of the connection unit, and a radio communication method.

BACKGROUND ART

Conventionally, such a technique has come into widespread use that a portable information device such as PDA, handheld computer, and the like is connected to a portable radio communication device such as a cellular phone and the like using a cable to transmit and receive various data stored in the portable information device via the portable radio communication device and to exchange address book data and the like between the portable information device and the portable radio communication device. Moreover, in a case where there is no compatibility therebetween due to a problem of the shape of the connector, etc, such a technique also has come into widespread use that a unit for data communication is connected to a connector for the portable radio communication device to implement data exchange between the portable radio communication device and the portable information device.

However, such the portable radio communication device cannot ensure general versatility since the data communication system and the protocol are different according to telecommunications carriers and a single data communication system and connection unit cannot be used in various kinds of the portable radio communication devices of telecommunications carriers.

Moreover, a trial has been made to upload image data transmitted from the outer section to the Internet provider via the portable radio communication device, however, in many cases, the telecommunications carriers use unique protocols and communication systems, so that general versatility at the time of data communication cannot be ensured.

DISCLOSURE OF INVENTION

In consideration of the aforementioned circumstances, the present invention has been made, and an object of the present invention is to provide a connection unit that can ensure general versatility to a usable portable radio communication device, a radio communication system, a control method of the connection unit, and a radio communication method.

In order to attain the above object, a connection unit according to the invention described in claim 1 is a connection unit, which is connected to a connector being attachably and detachably provided in a portable radio communication device, comprising first judging means for judging a communication protocol of the connected portable radio communication device based on information input via the connector; first receiving means for receiving data from the outer section of the portable radio communication device; and first converting means for converting data received by the first receiving means to a format along the communication protocol judged by the first judging means.

Accordingly, when the connection unit is connected to the connector of the portable radio communication device, the communication system of the relevant portable radio communication device is judged and image data received from the outer section is converted to the format along the judged communication system of the relevant portable radio communication device. Therefore, even if the portable radio communication device to which this connection unit is connected uses any communication system, this can be used for the general purpose, and data received from the outer section is converted to the format along the communication system of the connected portable radio communication device to make it possible to upload it to the server from the relevant portable radio communication device via WWW.

Moreover, the connection unit according to the invention described in claim 2 further comprises first conversion program storing means for storing a plurality of programs for converting data in accordance with the communication system; and first reading means for reading a corresponding program by the first conversion program storing means based on the communication system judged by the first judging means, wherein the first converting means converts the received data by executing the program read by the first reading means.

Accordingly, when the connection unit is connected to the connector of the portable radio communication device, the communication system of the relevant portable radio communication device is judged and the corresponding program is read by the conversion program storing means, and received data is converted to the format along the communication system of the judged relevant portable radio communication device by executing this program.

Moreover, a connection unit according to the invention described in claim 3 is a connection unit, which is connected to a connector being attachably and detachably provided in a portable radio communication device, comprising second judging means for judging a data communication system with the outer section of the portable radio communication device; second receiving means for receiving data from the portable radio communication device via the connector; and second converting means for converting data received by the second receiving means to a format along the communication system judged by the second judging means.

Accordingly, the connection unit connected to the connector of the portable radio communication device judges the data communication system at the time of transmitting data to the partner's device from the portable radio communication device, and converts data received from the portable radio communication device via the connector to the format along the judged data communication system. Therefore, even if any communication system is used between the portable radio communication device and the partner's device that transmits data, this can be generally used. This makes it possible to transmit data to arbitrary outer device from the relevant portable radio communication device after the portable radio communication device downloads data from the server on the WWW.

Moreover, the connection unit according to the invention described in claim 4 further comprises second conversion program storing means for storing a plurality of programs for converting data in accordance with the data communication system with the portable radio communication device; and second reading means for reading a corresponding program by the second conversion program storing means based on the data communication system judged by the second judging means, wherein the second converting means converts the received data by executing the program read by the second reading means.

Accordingly, when the communication system is judged at the time when data is transmitted to the partner's device from the portable radio communication device, the corresponding program is read by the conversion program storing means. Then, data received from the relevant portable radio communication device is converted to the format along the data communication system at the time when data is transmitted to the partner's device from the judged portable radio communication device by executing this program.

Moreover, the connection unit according to the invention described in claim 5 further comprises alarming means for alarming a data communication state with the portable radio communication device. Accordingly, the user can recognize the data communication state between the portable radio communication device and the connection unit connected thereto.

Moreover, in the connection unit according to the invention described in claim 6, the data is image data. Accordingly, it is possible to ensure general versatility at the time of transmitting and receiving image data.

Moreover, a connection unit according to the invention described in claim 7 is a connection unit, which is connected to a connector being attachably and detachably provided in a portable radio communication device, comprising at least radio communication modules for performing data communication with the outer section of the portable radio communication device by radio commutation; and cable communication modules for performing data communication with the outer section of the portable radio communication device by cable commutation. Accordingly, it is possible to deal with any of the radio communication and the cable communication.

Moreover, a connection unit according to the invention described in claim 8 is a connection unit, which is connected to a connector being attachably and detachably provided in a portable radio communication device, comprising: at least optical communication modules for performing data communication with the outer section of the portable radio communication device by optical commutation; and cable communication modules for performing data communication with the outer section of the portable radio communication device by cable commutation. Accordingly, it is possible to deal with any of the optical communication and the cable communication.

Moreover, a connection unit according to the invention described in claim 9 is a connection unit, which is connected to a connector being attachably and detachably provided in a portable radio communication device, comprising radio communication modules for performing data communication with the outer section of the portable radio communication device by radio commutation; optical communication modules for performing data communication with the outer section of the portable radio communication device by optical commutation; and cable communication modules for performing data communication with the outer section of the portable radio communication device by cable commutation. Accordingly, it is possible to deal with any of the radio communication, the optical communication and the cable communication.

Moreover, in the connection unit according to the invention described in claim 10, the radio communication module is a module that performs data communication by short-range radio communication. Accordingly, it is possible to deal with the Bluetooth system, which is being used as one of the short-range radio systems.

The connection unit according to the invention described in claim 11 further comprises alarming means for alarming in a data communication state. Accordingly, the can recognize the data communication state between the portable radio communication device and the connection unit connected thereto.

Moreover, the invention described in claim 12 is a radio communication system having a portable radio communication device and an outer device, the portable communication device comprising detecting means for detecting a connection request from the outer device; judging means for judging a data communication system with the outer device by the connection request detected by the detecting means; and communication means for performing data communication with the outer device by the data communication system judged by the judging means.

Accordingly, the portable radio communication device judges the data communication system at the time of receiving data from the outer device, and converts received data to the format along the judged data communication system. Therefore, even if any communication system is used between the portable radio communication device and the outer device that transmits data, this can be used for the general purpose.

Moreover, in the invention described in claim 13, the portable radio communication device further comprises alarming means for alarming a data communication state with the outer device. Accordingly, the can recognize the data communication state between the portable radio communication device and the outer device radio-connected thereto.

Moreover, in the invention described in claim 14, the outer device comprises image forming means and the data is image data image-formed by the image forming means. Accordingly, it is possible to ensure general versatility at the time of radio-transmitting and receiving image data.

Moreover, the invention described in claim 15 is the radio communication system described in claim 14 wherein the portable radio communication device is connected to a WWW connection server via a WWW (World Wide Web), and image data stored in the portable radio communication device is stored in a database connected to the server or image data stored in the database is transmitted and stored to the portable radio communication device via the WWW. There are considered cases of uploading (storing) to the database from the portable radio communication device via WWW and downloading (transmitting, storing) to the portable radio communication device.

Moreover, the invention described in claim 16 is a control method of connection unit, which is connected to a connector being attachably and detachably provided in a portable radio communication device, comprising the first judging step of judging a communication protocol of the connected portable radio communication device based on information input via the connector; the first receiving step of receiving data from the outer section of the portable radio communication device; and the first converting step of converting data received by the first receiving step to a format along the communication system judged by the first judging step.

Moreover, the invention described in claim 17 is a control method of a connection unit, which is connected to a connector being attachably and detachably provided in a portable radio communication device, comprising the second judging step of judging a data communication system with the outer section of the portable radio communication device, the second receiving step of receiving data from the portable radio communication device via the connector; and the second converting step of converting data received by the second receiving step to a format along the communication system judged by the second judging step.

Moreover, in the invention described in claim 18, the data is image data.

Therefore, according to the invention described in claims 16 and 17, the same effect as the invention described in claims 1 to 6 can be obtained by causing the computer to execute in the described steps. Accordingly, the control technique of the connection unit of the present invention can be easily worked out by causing the described processing steps to be executed by the microcomputer built in the connection unit.

Moreover, the invention described in claim 19 is a radio communication system that performs radio communication between a portable radio communication device and an outer device, comprising the detecting step of detecting a connection request from the outer device the judging step of judging a data communication system with the outer device by the connection request detected by the detecting step; and the communication step of performing data communication with the outer device by the data communication system judged by the judging step.

Moreover, the invention described in claim 20 further comprises the alarming step of alarming a data communication state with the outer device.

Moreover, in the invention described in claim 21, the outer device is an image forming device, and the data is image-formed image data. Therefore, according to the invention described in claims 19 and 20, the same effect as the invention described in claims 12 to 15 can be obtained by causing the computer to execute in the described steps. Accordingly, the communication technique of the present invention can be easily worked out by causing the described processing steps to be executed by the microcomputer built in the connection unit that performs radio communication with the outer device.

The inventions described in claims 22 to 25 are the inventions of the radio communication system comprising a portable phone type communication device, a connection unit, and a digital camera to implement means by which the writing and display of image data to the portable phone communication device and the digital camera are performed via the connection unit, and at this time, the format of image data is judged, and each is converted to the communication protocol to be used, thereafter storing to the memory and displaying on the display section. It is possible to rapidly and easily exchange image data between the portable phone communication device and the digital camera.

BRIEF DESCRIPTION OF THE DRAWINGS

FIG. 2 is a block diagram illustrating a circuit structure of a cellular phone terminal;

FIGS. 3A to 3F are views each illustrating an attachment, FIG. 3A is a front view, FIG. 3B is a left side view, FIG. 3C is a back view, FIG. 3D is a plane view, FIG. 3E is a bottom view, and FIG. 3F is a plane view showing an internal structure;

FIG. 4 is a block diagram showing a circuit structure of the attachment;

FIG. 5 is a memory structural view showing ROM of the attachment;

FIG. 19 is a view illustrating the display state of the display section of the digital camera;

FIG. 20 is a view illustrating the display state of the display section of the digital camera;

FIG. 21 is a view illustrating the display state of the display section of the digital camera;

FIG. 22 is a view illustrating the display state of the display section of the digital camera;

FIG. 25 is a block structural view illustrating the circuit structure of a cellular phone terminal according to the second embodiment;

FIG. 26 is a memory structural view illustrating ROM of the cellular phone terminal;

BEST MODE FOR CARRYING OUT THE INVENTION

The following will explain embodiments of the present invention with reference to the drawings.

First Embodiment (Structure of System)

Figure 1:
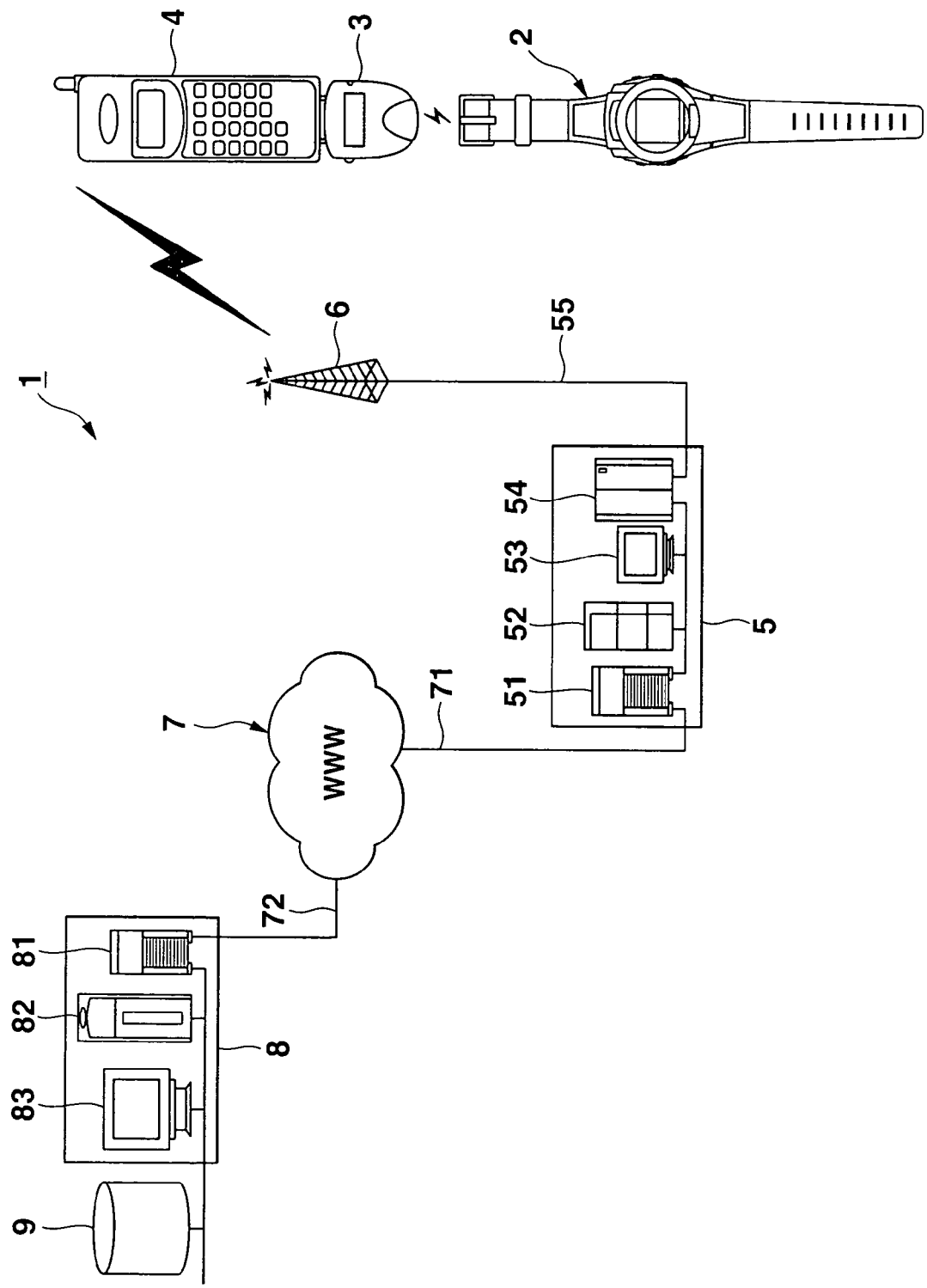
FIG. 1 is a view showing a system configuration according to a first embodiment of the present invention.

As illustrated in FIG. 1, an image data transmission/reception system 1 according to the first embodiment is composed of a digital camera (outer device) 2, an attachment (connection unit) 3, a cellular phone terminal (portable radio communication device) 4 to which the attachment 3 is connected, a communication service carrier 5, and a service provider 8 connected to the communication service carrier 5 via a WWW (World Wide Web) 7. The communication service carrier 5 includes an exchanger 54 connected to a radio base station 6 via a communication line 55, a monitor 53, a client management server 52, and a WWW connection server 51 connected to WWW 7 via a communication line 71. The service provider 8 includes a WWW server 81, which is connected to the WWW 7 via a communication line 72, a server 52 for service provider, and a monitor 83, and is connected to a database 9 that stores image data which the service user (client) uploads through WWW.

Then, the present embodiment considers a case in which image data formed and stored by the digital camera 2 is uploaded (stored) to the database 9 via the attachment 3, the cellular phone terminal 4, the radio base station 6, the communication service carrier 5, the WWW 7, and the service provider 8, or inversely, image data stored in the database 9 is downloaded (transmitted, stored) to the digital camera 2 via the service provider 8, the WWW 7, the communication service carrier 5, the radio base station 6, the cellular phone terminal 4, and the attachment 3.

(Structure of Cellular Phone Terminal)

FIG. 2 is a block diagram illustrating a circuit structure of a cellular phone terminal 4. As illustrated in the same figure, this is the same circuit as the circuit that the known cellular phone terminal has, and a CPU 405 connected to a bus 404 is provided. Moreover, a transmitting and receiving section 406, a communication processing section 407, a program memory 408, a timer section 409, a display I/F section 410, a driver 411, an UIM card 412, a data memory 413, a connector 414, an operation input section 415, and a speech decode/code processing section 416 are connected to the bus 404.

The transmitting/receiving section 406 includes an antenna 417, which transmits and receives a radio wave where a digital signal is overlapped between the radio base station 6 and the section 406 in a signal modulation/demodulation system such as CDMA, TDMA fixed by the communication service carrier 5, the received digital signal is sent to a low noise amplifier 451 via a transmission/reception sharing unit 418, modulated by a demodulating section 419, which operates when a signal is sent from a synthesizer 421, and subjected to equalization processing by an equalizer 420, and the resultant is sent to the communication processing section 407 that performs channel coding/decoding processing. The digital signal coded by the communication processing section 407 is modulated by a modulating section 422, which operates when a signal is sent from the synthesizer 421, and amplified by a power amplifying section 423, and radiated from the antenna 417 via the transmission/reception sharing unit 418.

The program memory 408 includes ROM having an area where an application/software, an upper layer protocol, and driver soft ware are stored, and the CPU 405 controls each circuit section based on various programs stored in the program memory 408. Moreover, the time counter 409 counts current time. The display I/F 410 is connected to the display section 425 having a dot-matrix type color LCD via the display driver 424, and the display section 425 is provided on the front surface of the main body of the cellular phone terminal 4. Then, the display driver 424 drives the display section 425 under control of the CPU 405, thereby displaying characters that form various information and mail, and connection to WWW 7 via the communication service carrier 5 makes it possible to browse the Internet site and display image data transferred from the digital camera 2. The driver 411 drives an LED 426 under control of CPU 405, and the LED 426 is provided at a predetermined location of the main body of the cellular phone terminal 4.

The UIM card 412 stores subscriber information such as a terminal ID of the relevant cellular phone terminal 4. The data memory 413 is RAM that stores various kinds of data such as memory dial information having a plurality of caller names and telephone numbers, and received data and the like, and is used as a work area for CPU 405. The connector 414 is structured to be connectable to an attachment 3 to be described later, and the operation input section 415 has keys that are arranged at the front surface of the main body. The speech decode/code processing section 416 is a speech codec to which a vibrator motor 427, a speaker 428, and a microphone 429 are connected. The vibrator motor 427 rotates in synchronization with a ring tone decoded by the speech decode/code processing section 416 to generate vibration in a case where the speaker 428 is in an off state. The speaker 428 reproduces the ring tone decoded by the speech decode/code processing section 416 and received sound, and the microphone detects the input speech and inputs it to the speech decode/code processing section 416, and the input speech signal is coded by the speech decode/code processing section 416.

(Structure of Attachment (Connection Unit))

FIGS. 3A to 3F are views each illustrating an attachment 3, FIG. 3A is a front view, FIG. 3B is a left side view. FIG. 3C is a back view, FIG. 3D is a plane view, FIG. 3E is a bottom view, and FIG. 3F is a plane view showing an internal structure. At the outer section of the attachment 3, there are provided a cellular phone connector 301, an LED 302, a sound release hole 303, a display section 304, an Ir communication section (Ir filter) 305, an USB port (negative form) 306, and a battery cover 507. At the upper end portion of the attachment 3, the cellular phone connector 301 is provided in a protruding manner, and is connectable to a connector 414 of the cellular phone terminal 4, 16 cores (for PCD) or 18 cores (for CDMA) are used. The LED 302 and the sound release hole 303 are formed at the side portion opposing to the attachment 3. The LED 302 can emit multi-color light, and blue (green) light emission indicates completion of communication and yellow light emission indicates in-communication, and red light emission indicates an error. The sound release hole 303 is one that releases a sound generated from the speaker 312 to be described later to the outer section.

The display section 304 is provided on the surface portion of the attachment 3, and performs the display of communication state with the peripheral device ("communication is standby", and the like), and the display of the communication protocol of the peripheral device (Ir; infrared communication, USB; USB connection, BT; Bluetooth (short-range radio communication)) by a bar-shape segment lighting. The Ir communication section (Ir filter) 305 is provided on the surface side at the lower end portion of the attachment 3, and the USB port 306 is provided on the rear surface side at the lower end portion. Namely, the Ir communication section 305 and the USB port 306 are provided on the front and rear at the same end portion of the attachment 3. The battery cover 507 is detachably and attachably provided at the rear surface of the attachment 3 to cover the space where the battery is contained.

In the interior of the attachment 3, a circuit board 308, which is connected to the cellular phone connector 301 and the USB port 306, is provided. On the circuit board 308, an antenna 311 for Bluetooth, a circuit section 310, the LED 302, a speaker 312, and an Ir communication module 309 are provided. The Ir communication module 309 includes a phototransistor (photodiode) and LED in the Ir communication section 305.

FIG. 4 is a block diagram showing a circuit structure of the attachment 3. As illustrated in the same figure, the attachment 3 has a CPU 313. The aforementioned connector 301, USB 306, Ir communication section 305 (Ir communication module 309) are connected to the CPU 313, and a ROM 314, a RAM 315, a radio processing section 316, a power circuit 317, a display driver 318, and an alarm driver 319 are also connected thereto. The antenna 311 for performing short-range radio communication with the peripheral device is connected to the radio processing section 316, and the power circuit 317 is connected to the battery. The display driver 318 is one that drives the display section 304, and includes a buffer, and the alarm driver 319 is one that drives the LED 302 and the speaker 312.

FIG. 5 is a conceptual view illustrating the contents of storage of the ROM 314, and areas 3140 to 3151 are provided therein. The area 3140 is a device ID memory and stores a product ID and a manufacturer ID of the relevant attachment 3, which are necessary to establish a link at the time of performing short-range radio communication with the cellular phone terminal 4 by Bluetooth system. In the area 3141, there is stored a conversion application program for mutually converting data between RGB data, which is color image data image-formed by the digital camera 2, and a GIF file, in the area 3142, there is stored a conversion application program for mutually converting data between RGB data and a JPEG file, and in the area 3143, there is stored a conversion application program for mutually converting data between RGB data and a PNG file. The conversion application programs stored in these areas 3141 to 3143 are selected according to software environments of the other end of communication. This selection is judged from the mail address of address book and URL.

Moreover, in the area 3144, there is stored an Ir communication driver/IrMC IrDA standards (software), in the area 3145, there is stored an Ir communication driver/other support (software), in the area 3146, there is stored a USB communication driver (software), and in the area 3147, there is stored a short-range radio communication (Bluetooth system) driver (software). Further, in areas 3148 to 3150, protocol setting data 1 to 3 for cellular phone data communication are respectively stored. These protocol setting data items 1 to 3 for cellular phone data communication are communication protocol setting data for the cellular phone terminal 4 that each communication service carrier adopts currently. In the area 3151, there are stored, for example, an application program for text conversion and an application program for PIM (personal information management) other than the conversion application program for various data (image data in the present embodiment).

Additionally, the area 3150 is not limited to the aforementioned application program for data conversion, and various kinds of application programs can be stored according to the specification and the kind of the outer peripheral device that performs communication.

For example, if the peripheral device has a GPS function, such the application program that converts positioning data to data format corresponding to the communication service carrier may be stored, if the peripheral device has a function that measures surrounding environments (temperature, pressure, luminance, noise) and information relating to a human body (pulse, steps), such the application program that converts these measuring data to data format corresponding to the communication service carrier may be stored. Furthermore, these application programs are desirably described by Java (registered trademark) Script that is downloadable by the service provider via WWW 7.

Figure 6:
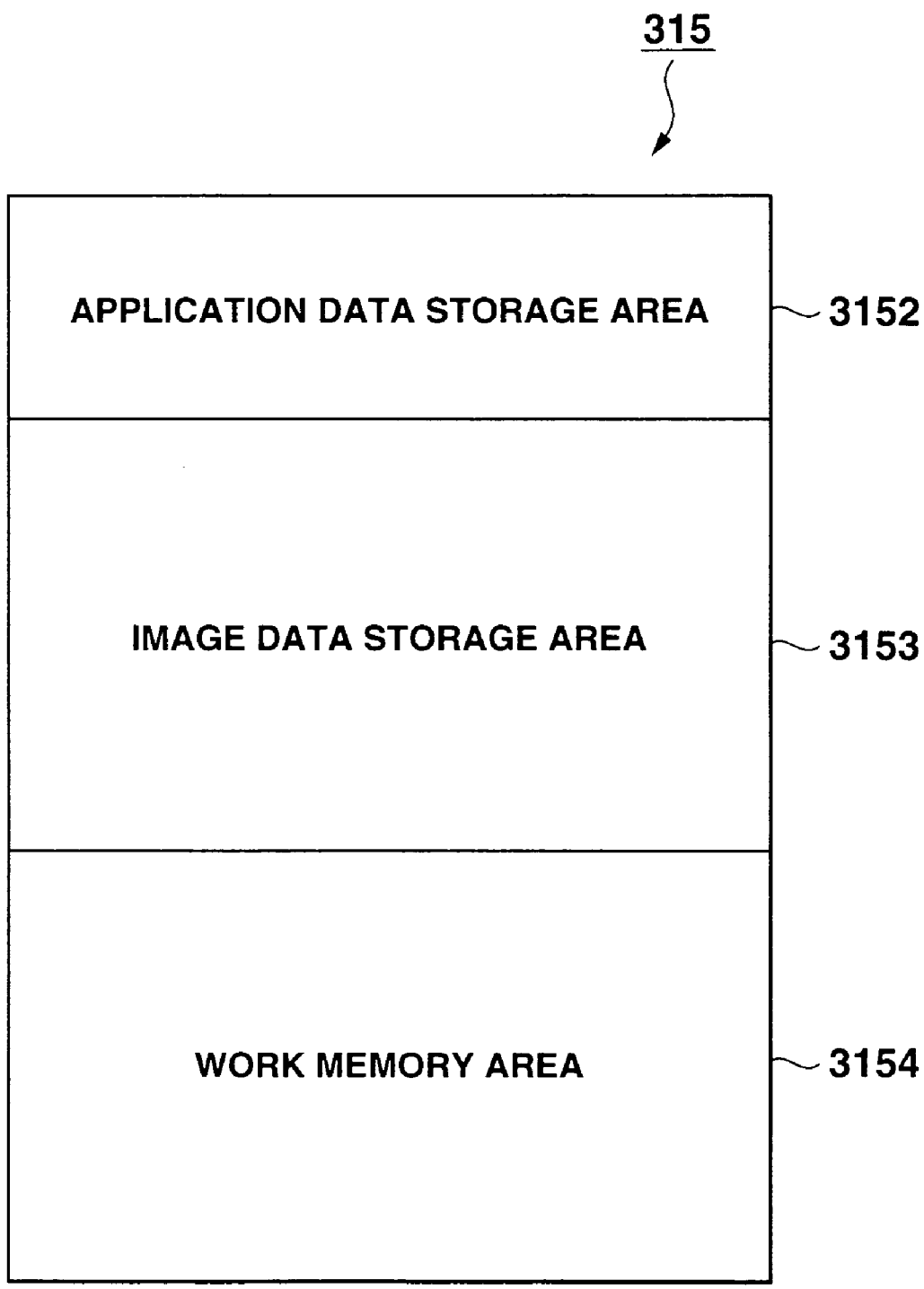
FIG. 6 is a memory structural view showing RAM of the attachment.

FIG. 6 is a conceptual view showing the storage contents of the aforementioned RAM 315 that has an application data storage area 3152, an image data storage area 3153, and a work memory area 3154. In the application data storage area 3152, the application programs stored in the areas 3141 to 3151 of the ROM 301 and stored as the programs currently set. In the image data storage area 3153, image data to be transmitted and received is stored, and the work memory area 3154 is used as working for CPU 313.

Figure 7:
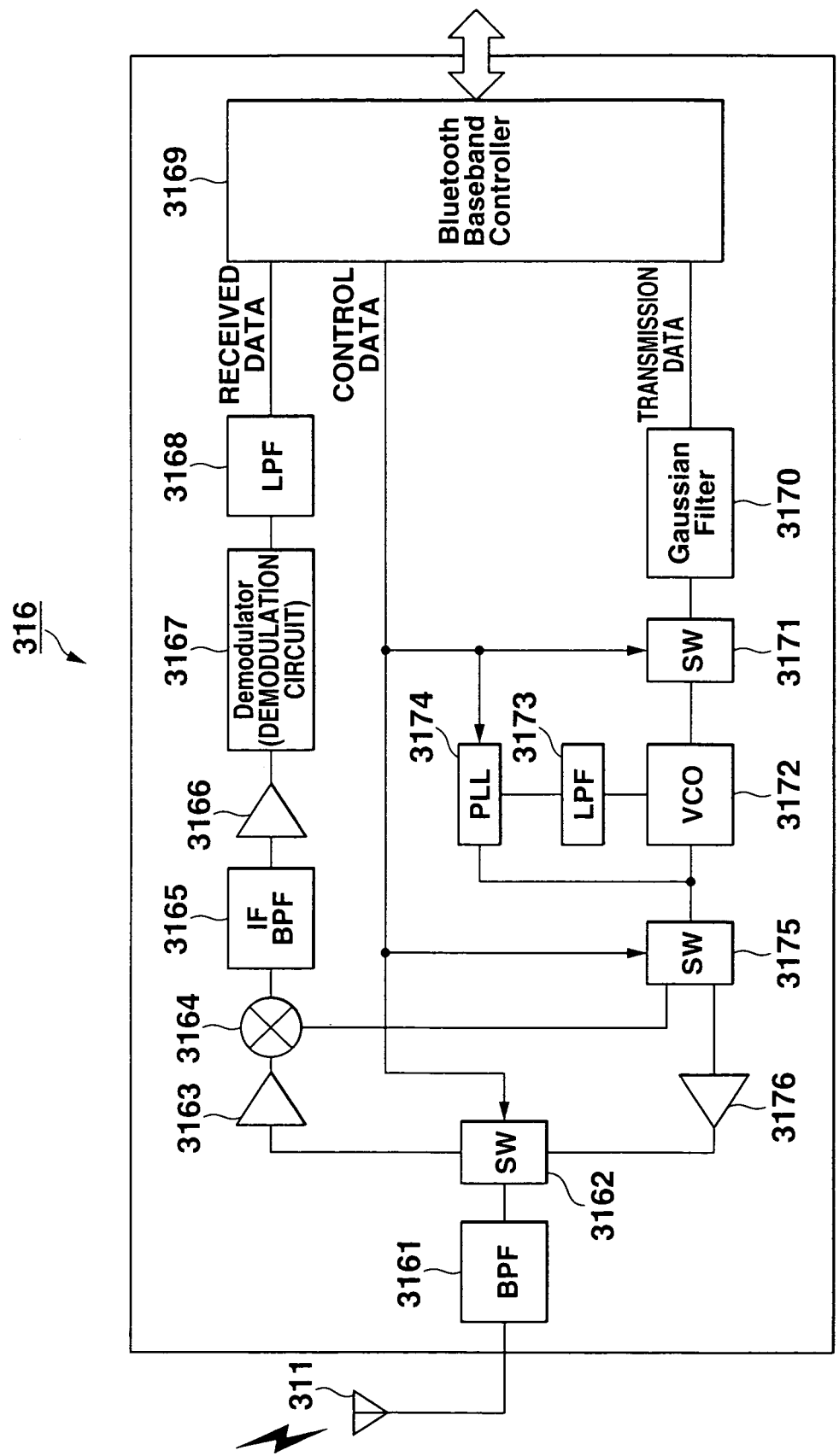
FIG. 7 is a block diagram showing a radio processing section of the attachment.

FIG. 7 is a block diagram illustrating the structure of the radio processing section 316. The antenna 311 is connected to a SW 3162 via a BPF 3161. Between the SW 3162 and Bluetooth Baseband Controller 3169, an amplifier 3163, a mixer 3164, an IFBPF 3165, an amplifier 3166, a demodulating circuit 3167, and an LPF 3168 are provided to form the receiving system, and a Gaussian Filter 3170, an SW 3171, a PLL synthesizer 3174, an LPF 3173, a VCO 3172, an SW 3157, and an amplifier 46 are provided to form the transmitting system. Moreover, control data from the Bluetooth Baseband Controller 3169 is sent to SWs 3162, 3157, 3171, and PLL synthesizer 3174 to perform communication control.

(Structure of Digital Camera)

Figure 8:
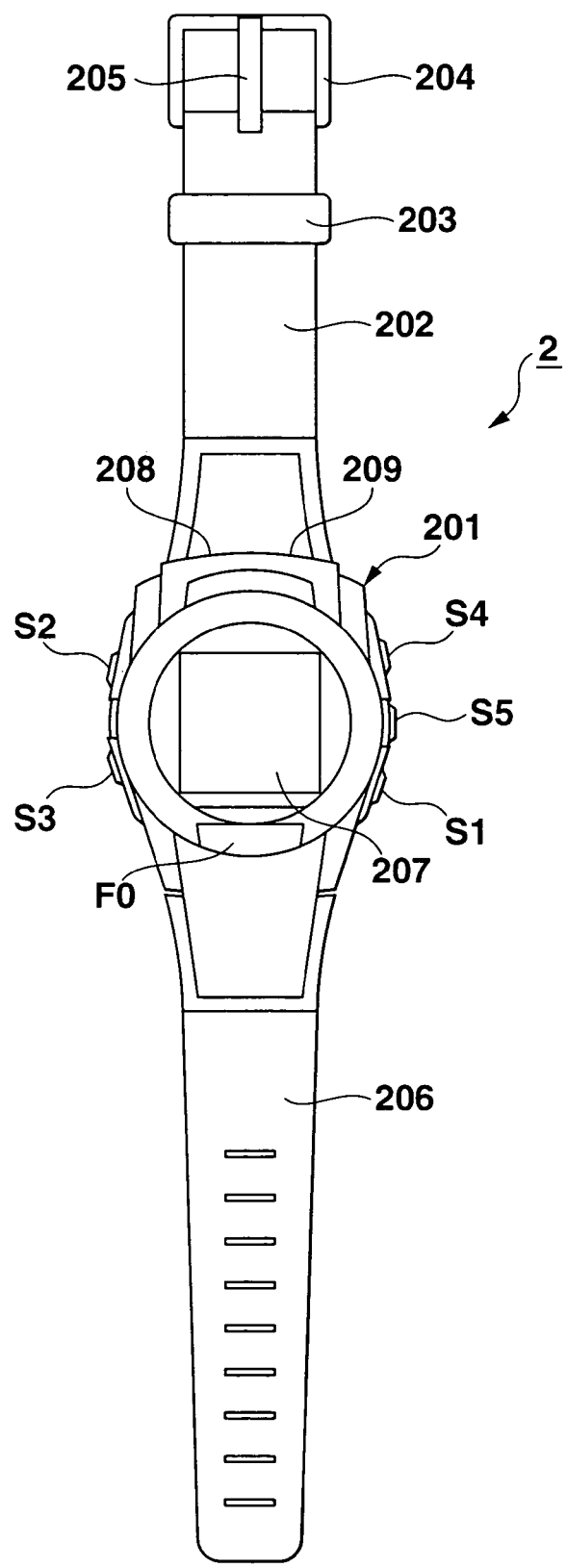
FIG. 8 is a plane view showing an outer appearance structure of a digital camera.

FIG. 8 is a plane view showing an outer appearance structure of the digital camera 2. The digital camera 2 in the present embodiment is a dedicated external device that performs data exchange between the cellular phone terminal 4 and the attachment 3 attached thereto. The digital camera 2 has a shape that is attachable to the arm, and includes a device main body 201, and a pair of wristbands 202 and 206 hooked on the end portions of the device main body 201 which are opposite to each other. One wrist band 202 has a sheath 203, a buckle 204, and a latching pin 205. Key input portions S1 to S5 each having a key switch are provided on both side portions of the device main body 201, and a display section 207 having a color LCD is provided on the upper surface, and a shutter key F0 is provided thereon. By the operations of the key switches S1 to S5, the cellular phone terminal 4 and the attachment 3 attached thereto, and Ir communication are operated. Namely, by the operations of key switches S1 to S5, data is transmitted to the digital camera 2 from the cellular phone terminal 4 via the attachment 3 to be displayed on the display section 207 of the digital camera 2, and data stored in the digital camera 2 can be transmitted to the cellular phone terminal 4 via the attachment 3. On the end portion of the wristband 202 of the device main body 201, there are provided a lens unit 209 of a color camera module 218 to be described later and an Ir transmission/reception section 208 of an Ir communication module 215 are.

Figure 9:
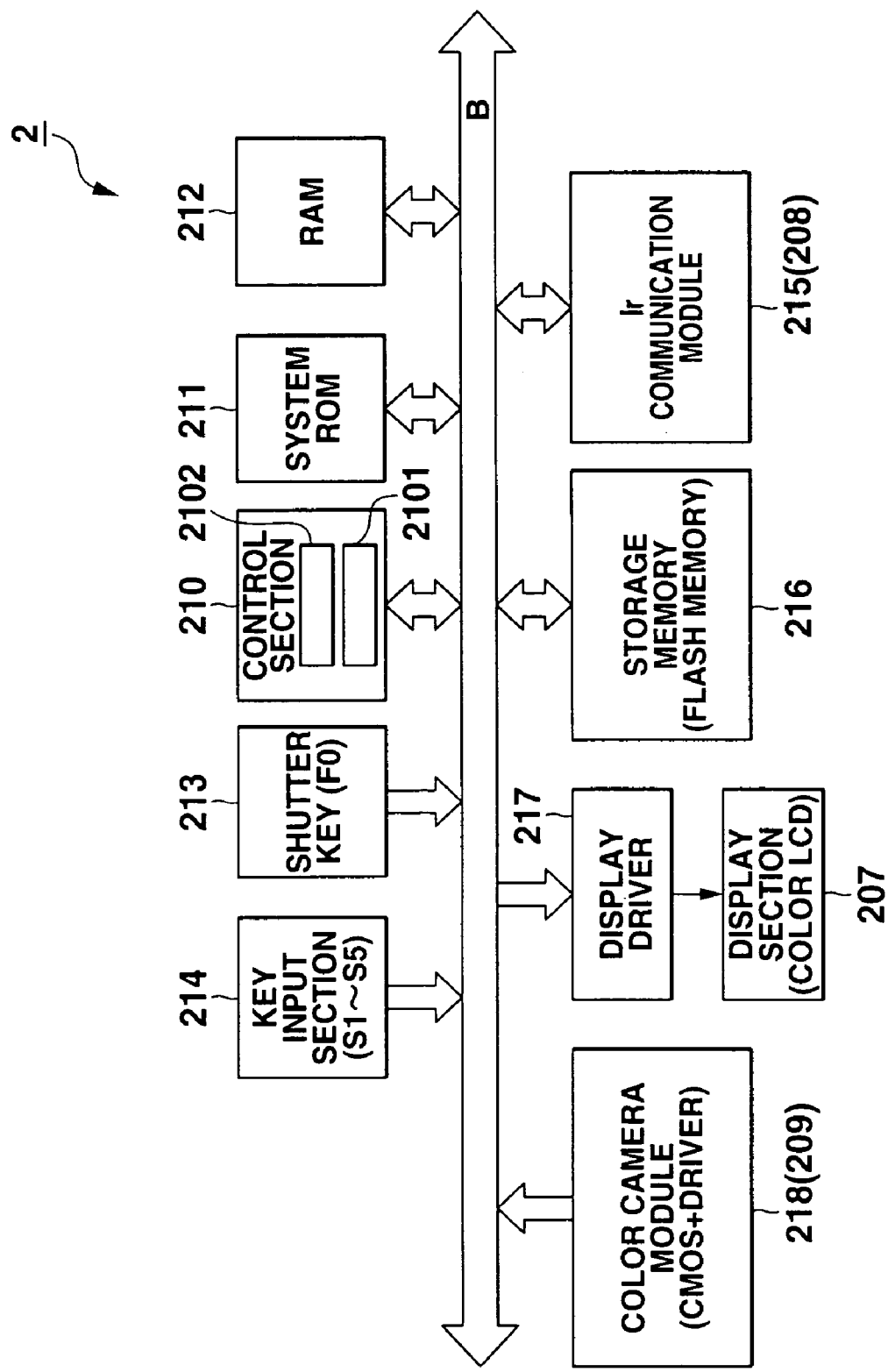
FIG. 9 is a block diagram showing a circuit structure of the digital camera.

FIG. 9 is a block diagram illustrating the circuit structure of the digital camera 2. As illustrated in the figure, a system ROM 211, a RAM 212, a storage memory (flash memory) 216, a display driver 217, a shutter key input block 213, which inputs a signal from the shutter key F0, a key input block 214, which inputs a signal from the key input sections S1 to S5, a color camera module 218 having the lens unit 209, and an Ir communication module 215 having the Ir transmission/reception section 208, are connected to a control section 210 via a bus B.

The control section 210 is one that controls each section by operating the RAM 212 as a working area according to the program stored in the system ROM 211, and has a clock generating section 2101 and a timer circuit 2102. The display driver 217 is one that drives the display section 207. The color camera module 218 is one that can perform color-image forming, and includes the lens unit 209, CMOS, and the driver. The storage memory 216 includes a flash memory, and stores JPEG file-formatted color image data of an object image-formed using the color camera module 218 by the operation of the shutter key F0. The Ir communication module 215 includes the Ir transmission/reception section 208 that infrared-transmits color image data of an object image-formed by the color camera module 218 by the operation of the shutter key F0 or color image data stored in the storage memory 216 (both are JPEG formatted but, depending on the communication destination, data converted to RGB data by the control of the controlling section 210 prior to the infrared communication) to the attachment 3.

An explanation will be next given of the operation of the present embodiment.

Figure 10:
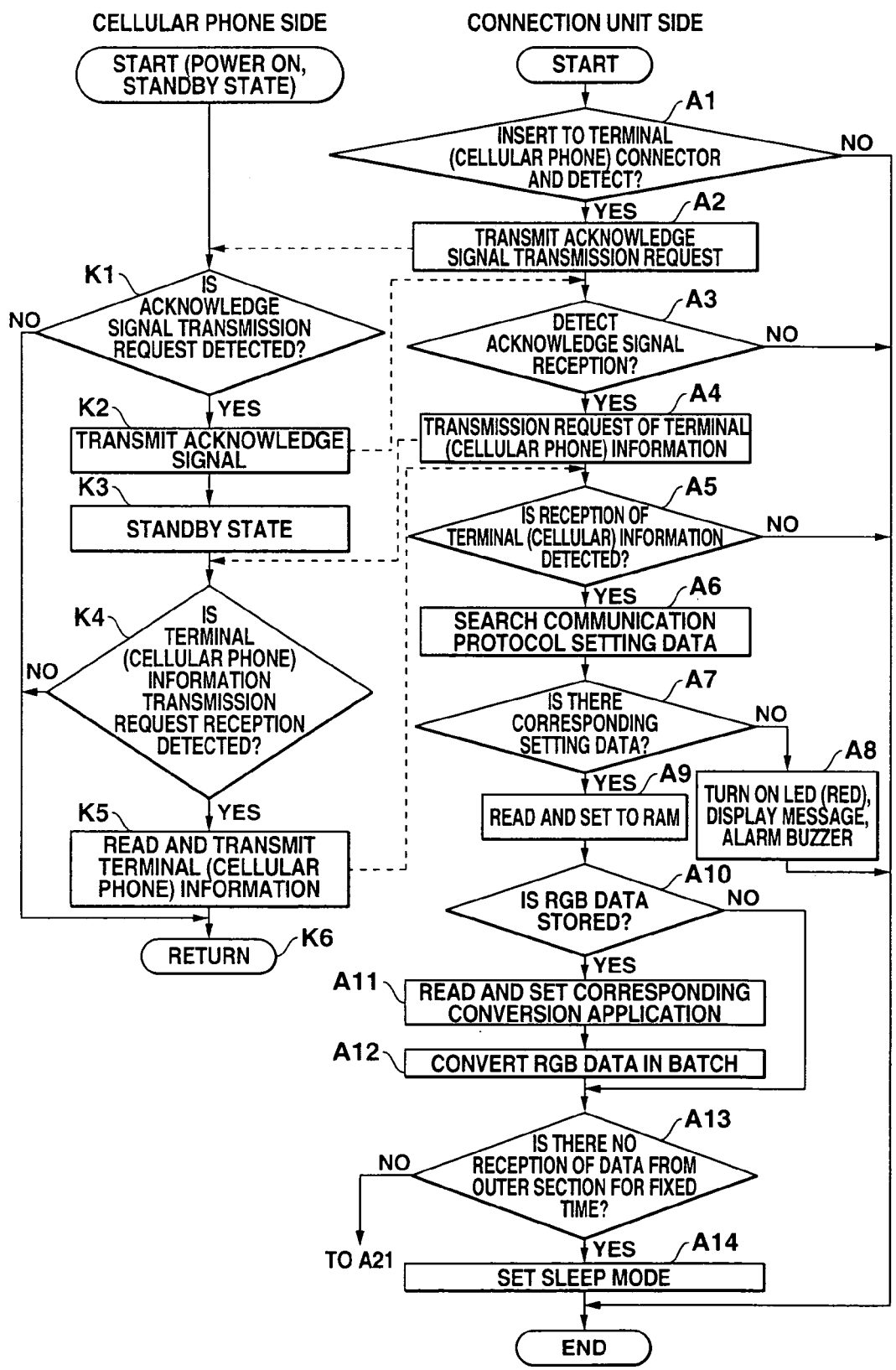
FIG. 10 is a flowchart showing an operation sequence of a cellular phone terminal and that of the attachment.

FIG. 10 is a flowchart illustrating a link establishment operation sequence between the cellular phone terminal 4 and the attachment 3. When the cellular phone terminal 4 is powered on and is in a standby state, the connector 301 of the attachment 3 is inserted to the connector 414 of the cellular phone terminal 4. After that, the attachment 3 detects this insertion (step A1), and transmits an acknowledgment (ACK) signal transmission request to the cellular phone terminal 4 (step A2).

The cellular phone terminal 4 judges the detection of the acknowledgement signal transmission request (step K1) and transmits the acknowledgement signal to the attachment 3 (step K2), and returns to the standby state (step K3). When the attachment 3 judges whether the reception of the acknowledgement signal is detected (step A3) and detects this, and the attachment 3 transmits a transmission request of various information such as the communication protocol, data format, and the like used by the relevant cellular phone terminal 4, adopted at the relevant cellular phone terminal to the cellular phone terminal 4 (step A4). When detecting the reception of this transmission request (step K4), the cellular phone terminal 4 reads terminal information such as the communication system, data format, and the like, which are prestored in the upper layer protocol area of the program memory 408 and used by the relevant terminal, and transmits it to the attachment 3 (step K5).

When detecting the reception of this terminal information (step A5), the attachment 3 searches communication protocol setting data stored in the areas 3148 to 3150 of ROM 314 (step A6), and judges whether there is corresponding communication protocol setting data (step A7). When there is no corresponding communication protocol setting data in any areas 3148 to 3150, LED is caused to emit red light and this is displayed on the display section 304, and a buzzer is generated from the speaker 312 to send a notice (step A8). When there is the corresponding communication protocol setting data in any one of areas 3148 to 3150, this is read to set to the application data storage area 3152 of RAM 315 (step A9).

Moreover, when it is judged whether RGB data is stored in the image data storage area 3153 of RAM 315 (step A10) and it is not stored therein, the processing flow proceeds to step A13 without executing processing in step A11 and A12. When RGB data is stored in the image data storage area 3153, the application program conforming to the protocol of the cellular phone terminal 4 connected this time is read from any one of areas 3141 to 3143 to set to the application data storage area 3152 of ROM 315 (step A11), and RGB data stored in the image data storage area 3153 is converted in batch (step A12). In other words, if RGB data is stored in the image data storage area 3153 before connection, conversion to the corresponding format by the application program set in step A11. In addition, at the time when the connection to the cellular phone terminal 4 is released, if image data formatted according to the communication protocol is stored in the image data storage area 3153, this is inversely converted to RGB.

Sequentially, when it is judged whether there is data reception from the outer section for a fixed time (step A13) and there is no data reception from the outer section, a sleep mode is set (step A14). This sleep mode is a mode that is used to suppress power consumption to a degree that the storage contents of each circuit section (particularly RAM 315) is held to minimum, and when the battery is monitored via the power circuit 317 and a battery capacity (Vol) falls below a predetermined value, the LED is caused to emit red light to send a notice.

Figure 11:
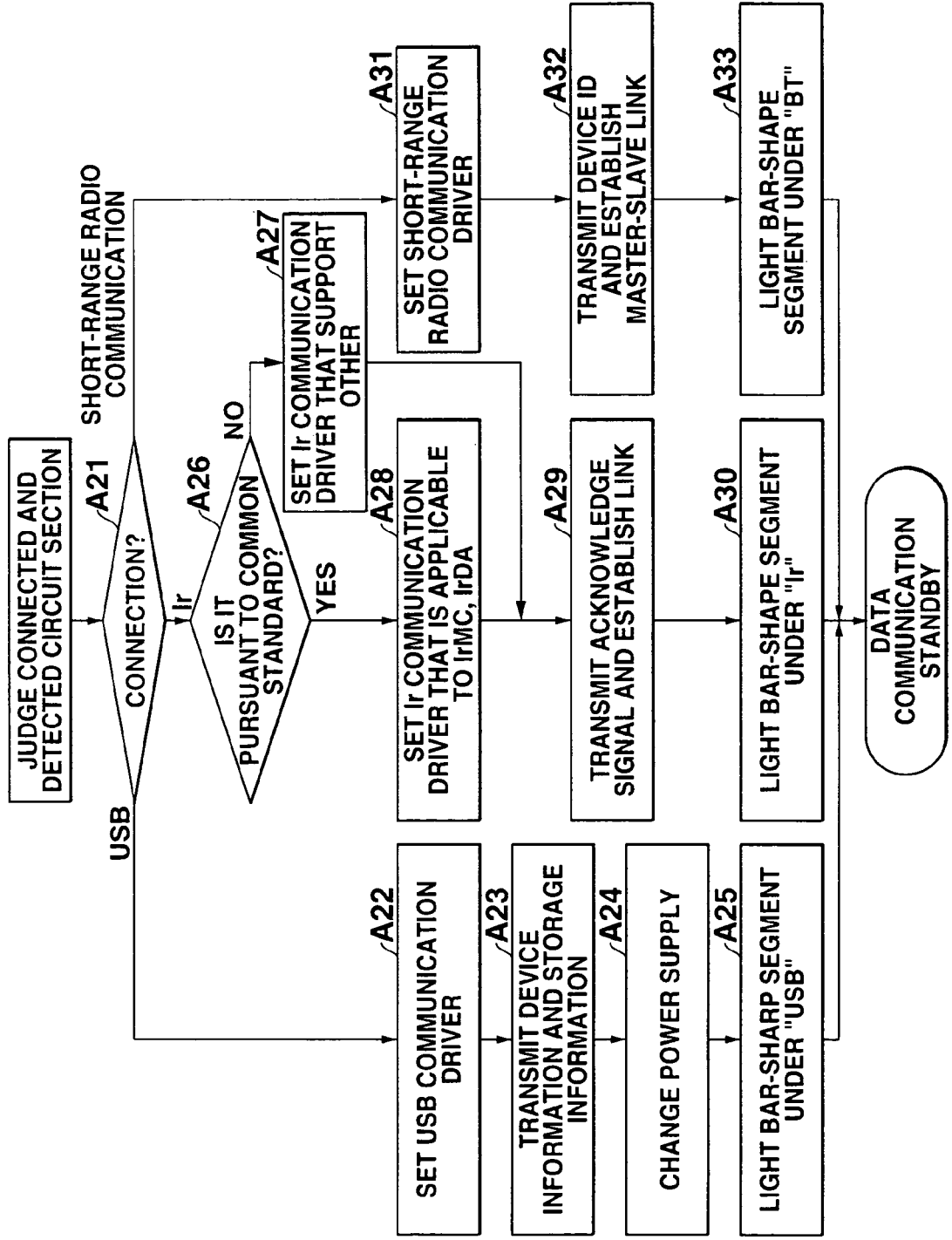
FIG. 11 is a flowchart subsequent to NO in step A13 of FIG. 10.

While, when there is the data reception from the outer section for a fixed time as a result of judgment in step A13, the attachment 3 operates according to the flowchart illustrated in FIG. 11. At this time, when it is judged whether the data reception is USB, Ir (Infrared ray), or short-range radio communication (Bluetooth system) (step A21) and it is USB, the USB communication driver stored in the area 3146 of ROM 314 is set to the application data storage area 3152 of RAM 315 (step A22). Moreover, device information and storage information of the relevant attachment 3 are transmitted to the connected PC and the like (step A23), and power supply is changed to power to be supplied from the PC side of the connection destination through the USB port 306 (step A24). Moreover, the bar-shape segment under "USB" is lit at the display section 304 (step A25) and the state enters a data communication standby state.

Moreover, when there is the data reception is Ir as a result of judgment in step A21, it is judged whether data received as Ir is pursuant to the infrared communication protocol (common standard) from the received signal format or header information of received data (step A26). In this case, if it is Ir data (infrared data) transmitted from the PC (or infrared port connected to the PC) installed on the standard OS (Operating System), PDA, and other external peripheral device, Ir communication driver/IrMC IrDA standards stored in the area 3144 of ROM 314 are set to the application data storage area 3152 of RAM 315 (step A27). Moreover, if it is unique Ir data (infrared data), Ir communication driver/other support stored in the area 3145 of ROM 314 are set to the application data storage area 3152 of RAM 315 (step A28). Further, the acknowledgement signal is sent to the digital camera 2 and the link with the digital camera 2 is established (step A29). Furthermore, the bar-shape segment under "Ir" is lit at the display section 304 (step A30) and the state enters a data communication standby state.

Moreover, when the data reception is short-range radio communication (Bluetooth system) as a result of judgment in step A21, the short-range radio communication (Bluetooth system) driver stored in the area 3147 of ROM 314 is set to the application data storage area 3152 of RAM 315 (step A31). Next, the device ID stored in the area 3140 of ROM 314 is transmitted and data exchange with the peripheral device of the communication partner as a master, and a master-slave link is established between the attachment 3 and the communication partner's peripheral device that performs the short-range radio communication (step A32). Furthermore, the bar-shape segment under "BT" is lit at the display section 304 (step A33) and the state enters a data communication standby state.

Figure 12:
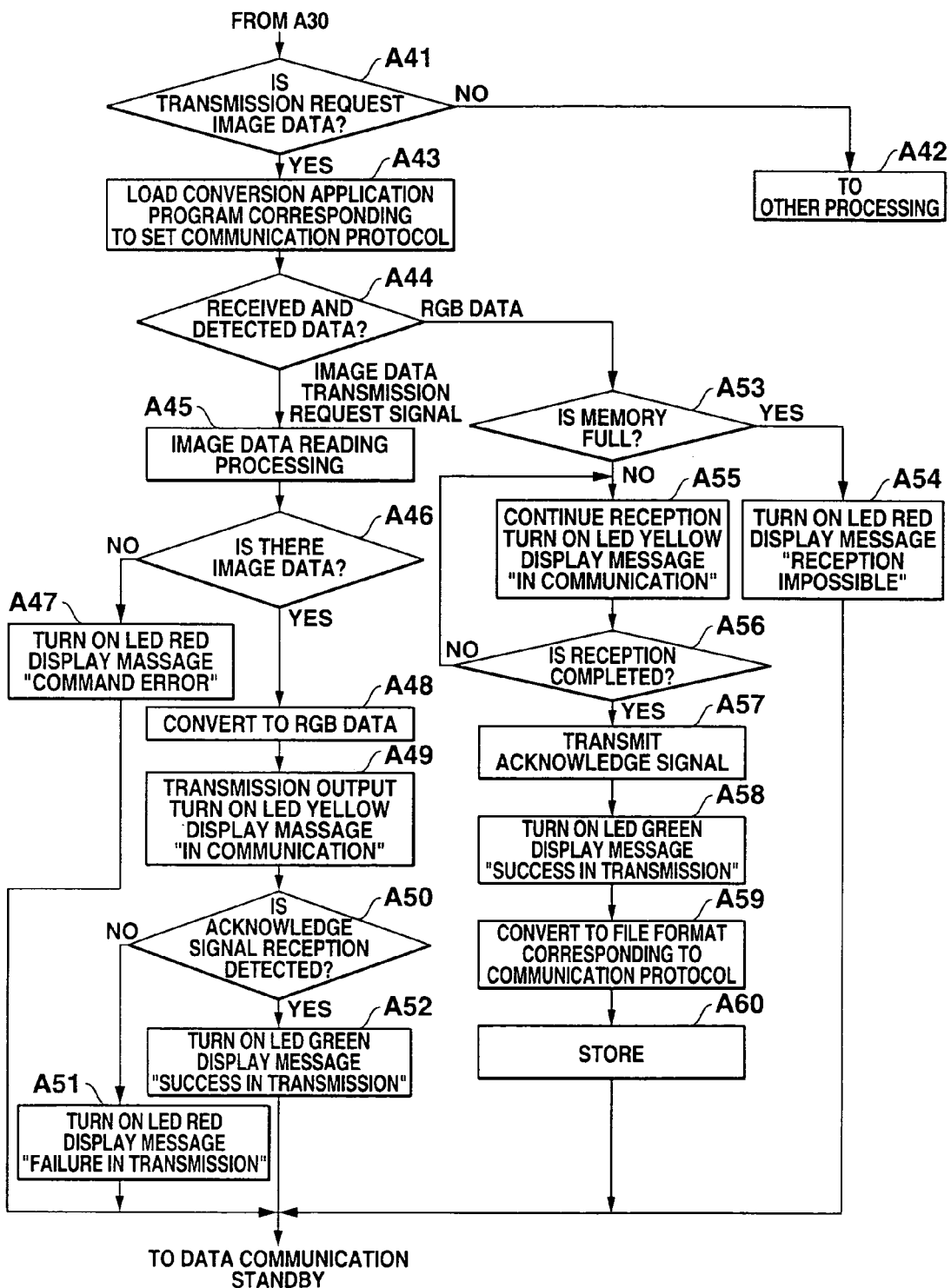
FIG. 12 is a flowchart subsequent to step A30 of FIG. 11.

FIG. 12 is a flowchart illustrating processing that is executed by the attachment 3 subsequent to step A30 in a case where the data reception is Ir as a result of the judgment in step A21 and No in step A26, namely, data using the infrared ray is transmitted from the digital camera 2. In other words, when it is judged whether a transmission request from the digital camera 2 is image data (step A41) and it is data other than the image data, other processing is executed (step A42). When it is image data, any one of conversion application programs stored in the areas 3141 to 3143 of ROM 3144 corresponding to the communication protocol set in the step A28 is loaded to the area 3152 of RAM 315 (step A43).

Moreover, it is judged whether data received and detected from the digital camera 2 is RGB data or an image data transmission request signal (step A44). When it is not RGB but the image data transmission request signal, reading processing of image data from the image data storage area 3153 is performed (step A45), and it is judged whether image data is present (step A46). When image data is not stored in the image data storage area 3153, the LED 302 is caused to emit red light and a message "command error" is displayed on the display section 304 (step A47).

Moreover, when image data is stored in the image data storage area 3153, this is converted to RGB data (step A48). Further, this RGB data is transmitted and output to the digital camera 2 from the Ir transmitting section 305 to cause the LED 302 to emit yellow light and to display a message "in transmission" on the display section 304 (step A49). Next, it is judged whether the reception of acknowledgement signal sent from the digital camera 2 in response thereto is detected (step A50). Then, when the acknowledgement signal is not received, the LED 302 is caused to emit red light and to display a message "failure in transmission" (step A51). When the acknowledgement signal is received, the LED 302 is caused to emit green light and to display a message "success in transmission" on the display section 304 (step A52).

Moreover, when the received and detected data is RGB data as a result of judgment in step A44, namely the image data with RGB format is transmitted from the digital camera 2, it is judged whether the memory (image data storage area 3153) is already full (step A53). When it is already full, the LED 302 is caused to emit red light and to display a message "reception impossible" on the display section 304 (step A54).

However, when it is not full, the reception is continued and the LED 302 is caused to emit yellow light and to display a message "in reception" on the display section 304 (step A55). Moreover, it is judged whether the reception of RGB data is completed (step A56), and when it is completed, the acknowledgement signal is transmitted to the digital camera 2 (step A57). Next, the LED 302 is caused to emit green light and to display a message "success in reception" on the display section 304 (step A58). Sequentially, received RGB data is converted to a file format corresponding to the communication protocol of the cellular phone terminal 4 to which the attachment 3 (step A59), thereafter being stored to the image data storage area 3153 again (step A60).

Figure 13:
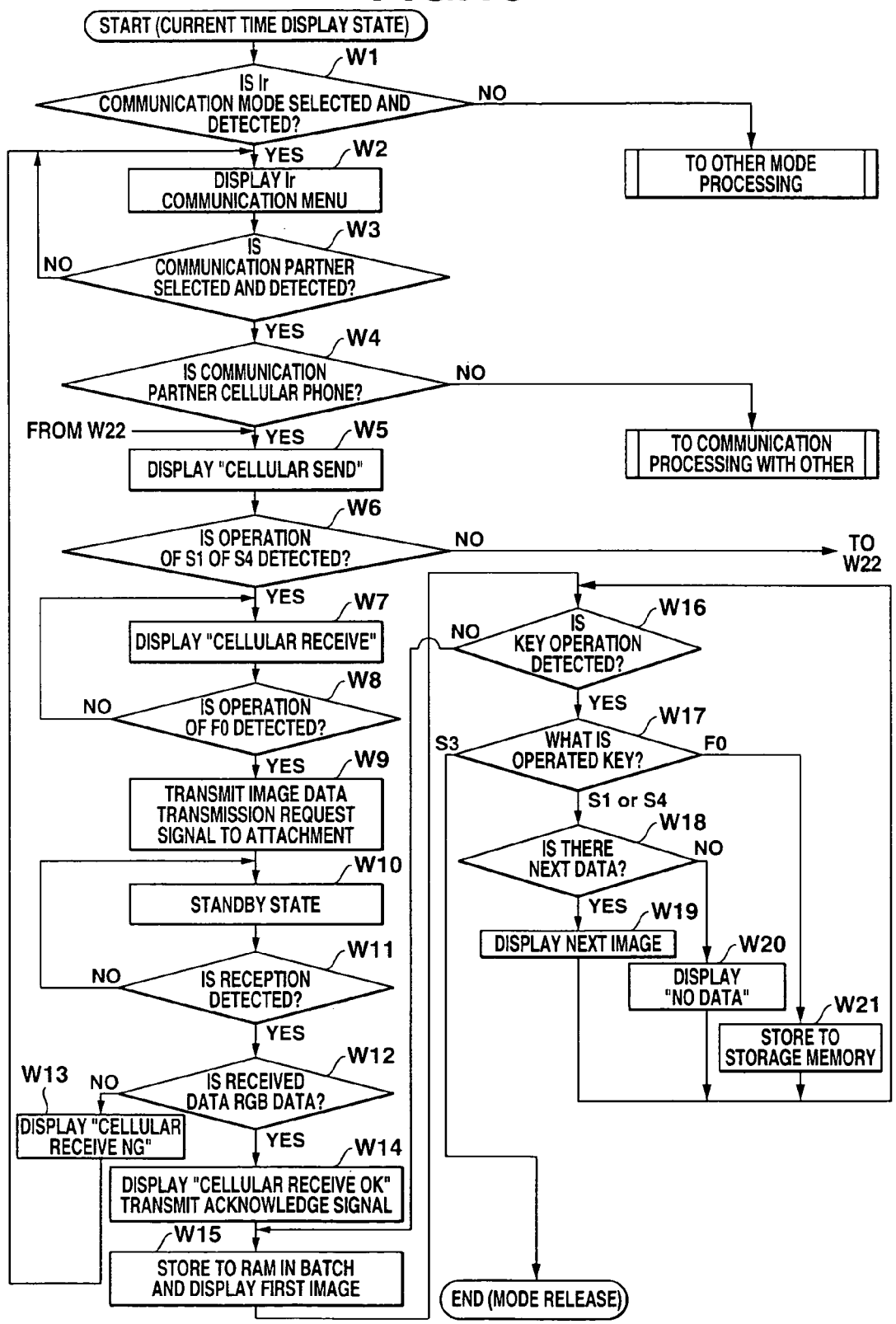
FIG. 13 is a flowchart illustrating the processing operations of the digital camera.

FIG. 13 is a flowchart illustrating the processing operation of the digital camera 2 corresponding to the flowchart of FIG. 12. The digital camera 2 performs a current time display on the display section 207 in a normal mode state. In this state, it is always detected whether the Ir communication mode is selected by a predetermined operation to the keys S1 to S5 (step W1). Then, when Ir communication mode is selected, the time display is changed to perform Ir communication menu display (step W2).

Figure 15:
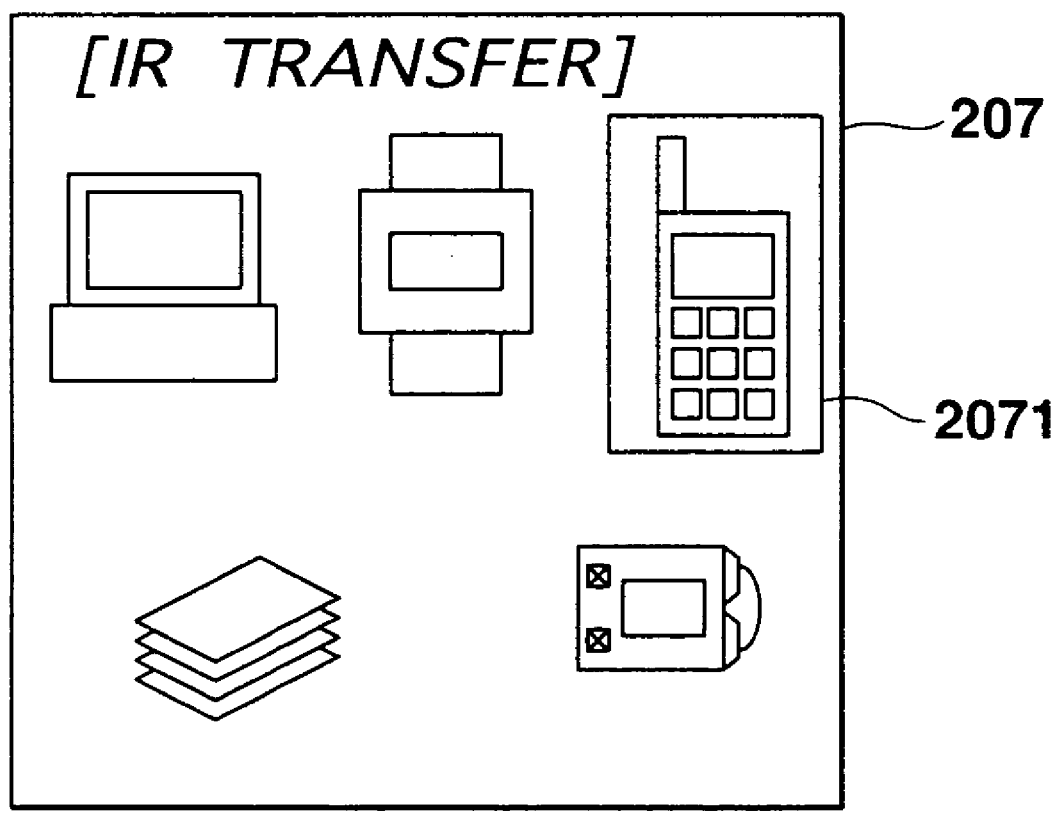
FIG. 15 is a view illustrating a display state of the display section of the digital camera.

FIG. 15 is a view illustrating the display state of the display section 207 of the digital camera 2 in step W2.

In this display state, "IR TRANSFER" indicating the Ir communication mode state is displayed on the upper portion of the display section 207, and each icon indicating the other end of communication is displayed at the lower portion.

Figure 16:
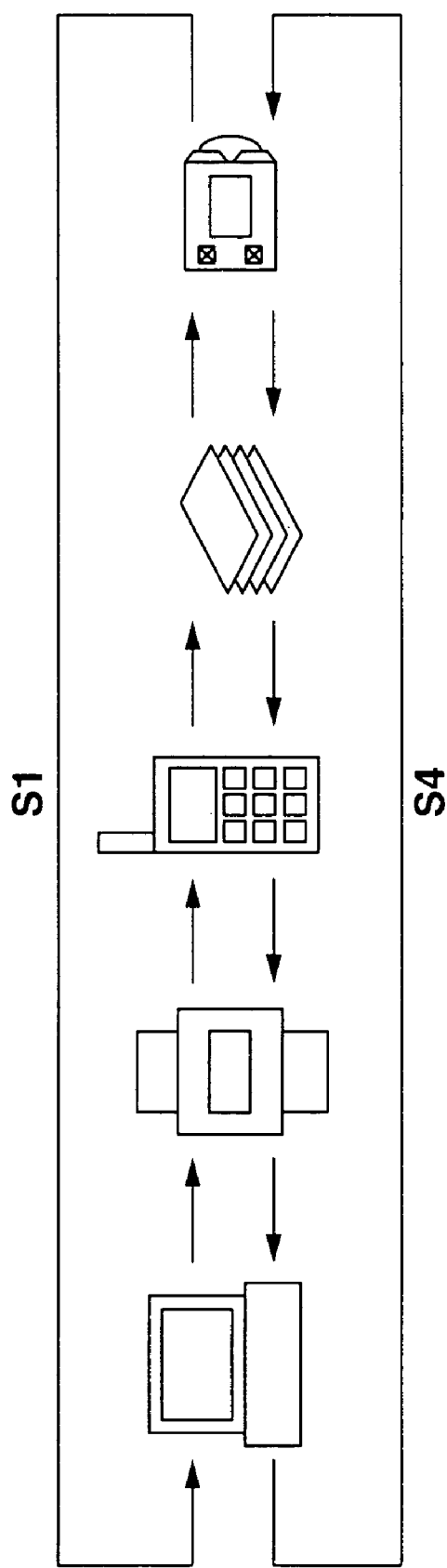
FIG. 16 is a view illustrating the relationship between icons displayed on the display section of the digital camera at the other end of communication and the operation contents of keys S1 and S4.

In other words, there are displayed the respective icons "PC" (personal computer or infrared communication port connected to the personal computer), "digital camera" having the same specification as the digital camera 2, "cellular phone" from the upper left side, and "Other", which is the device such as other PDA and the like, and "portable game machine" from the lower left side. As illustrated in FIG. 16, a square frame 2071 that indicates the communication partner is moved every time when the key S1 or S4 is operated.

Additionally, in the case of performing transmission and reception of image data to/from the other end of communication that supports common standards such as IrMC, IrDA, and the like in the infrared communication protocol, since image data stored in the storage memory 216 is data with JPEG file format, data is read and transmitted directly, but in the case of performing transmission and reception of image data to/from the other end of communication that does not support the common standards, image data (JPEG file formatted data) stored in the storage memory 216 is reconverted to the format of RGB data, RWA data, YUV data to transmit without being read and transmitted directly. Moreover, the associations between these communication partners and transmittable/receivable data formats are stored and set in the system ROM 211 in advance, however, in the present embodiment, since Ir communication driver/other support is set at the attachment 3, it is assumed that RGB data is transmitted and received. Accordingly, after waiting the detection of the operations of the keys S1 and S4 from the display state in step W2 to judge which one of the menus of the communication partner is selected (step W3).

Figure 17:
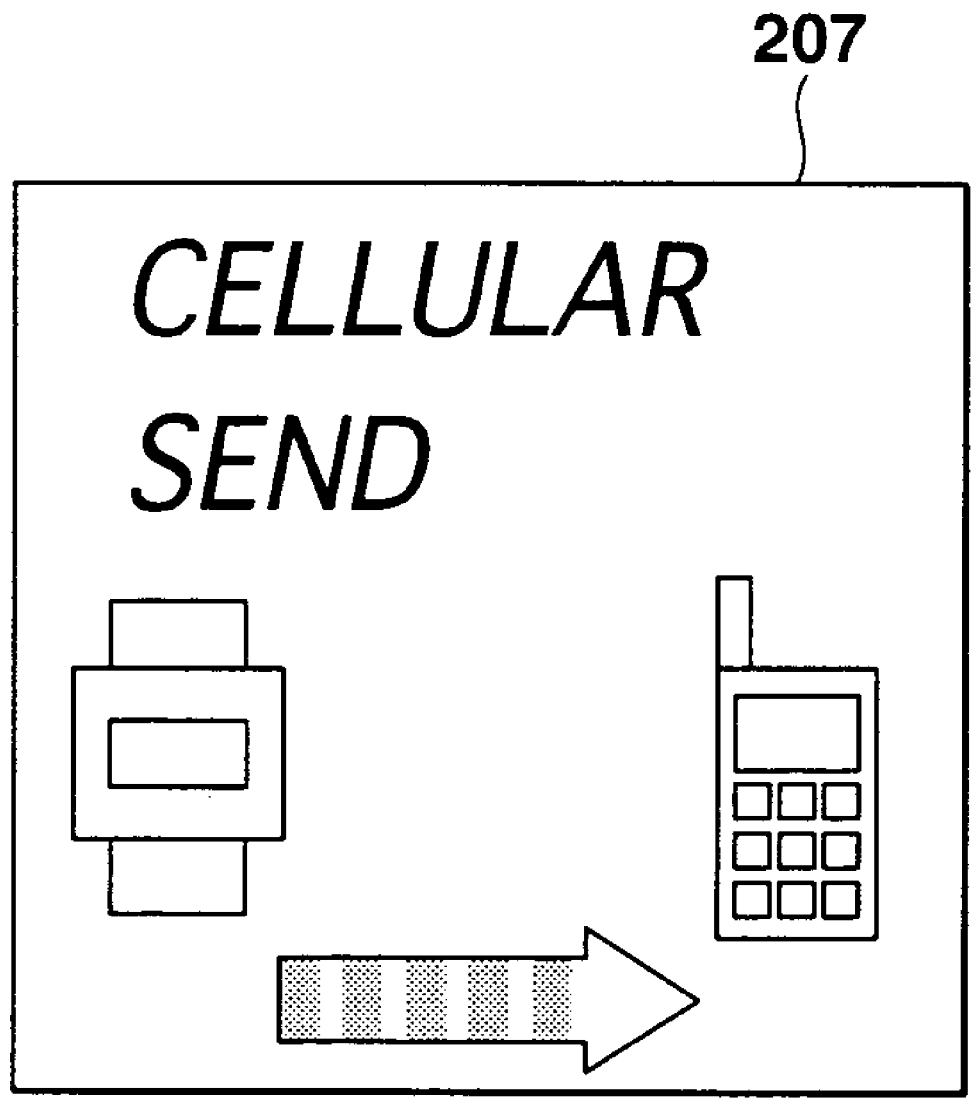
FIG. 17 is a view illustrating the display state of the display section of the digital camera.

At this time, detection of the operation of key S1 is performed twice or detection of the operation of key S4 is performed three times from the display state in the above step W2, thereby judging whether "cellular phone" is selected (step W4). When "cellular phone" is selected, "CELLULAR SEND" is displayed on the display section 207 as illustrated in FIG. 17 (step W5) to judge the key S1 or S4 is operated (step W6). When neither the key S1 nor S4 is operated, the processing flow proceeds to step W22 in FIG. 14 to be described later.

Figure 18:
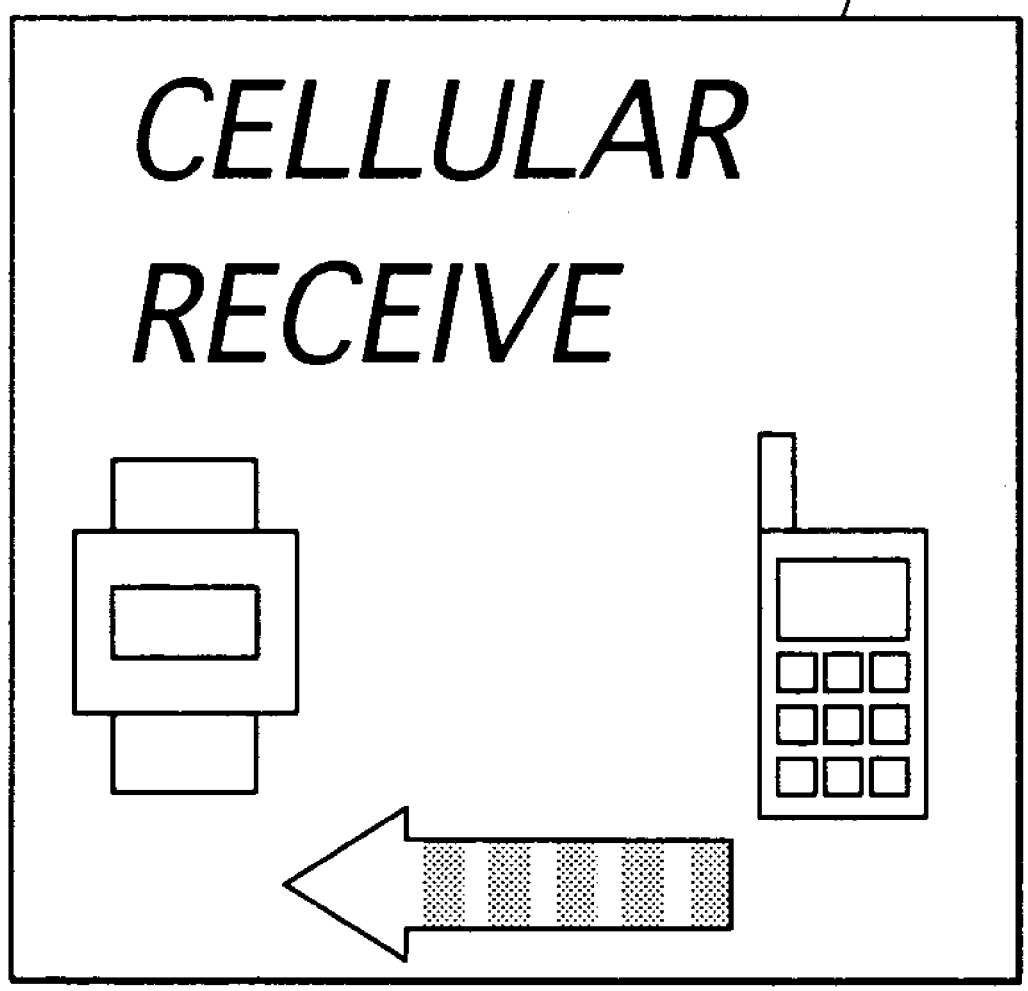
FIG. 18 is a view illustrating the display state of the display section of the digital camera.

When either the key S1 or S4 is operated, "CELLULAR RECEIVE" is displayed on the display section 207 as illustrated in FIG. 18 (step W7), thereafter detecting the presence or absence of the operation to the shutter key F0 (step W8). When the operation to the shutter key F0 is detected, a transmission request signal of image data is transmitted to the attachment 3 (step W9), thereafter entering the standby state (step W10), and the standby state is continued until the reception of data is detected (step W11).

Figure 19:
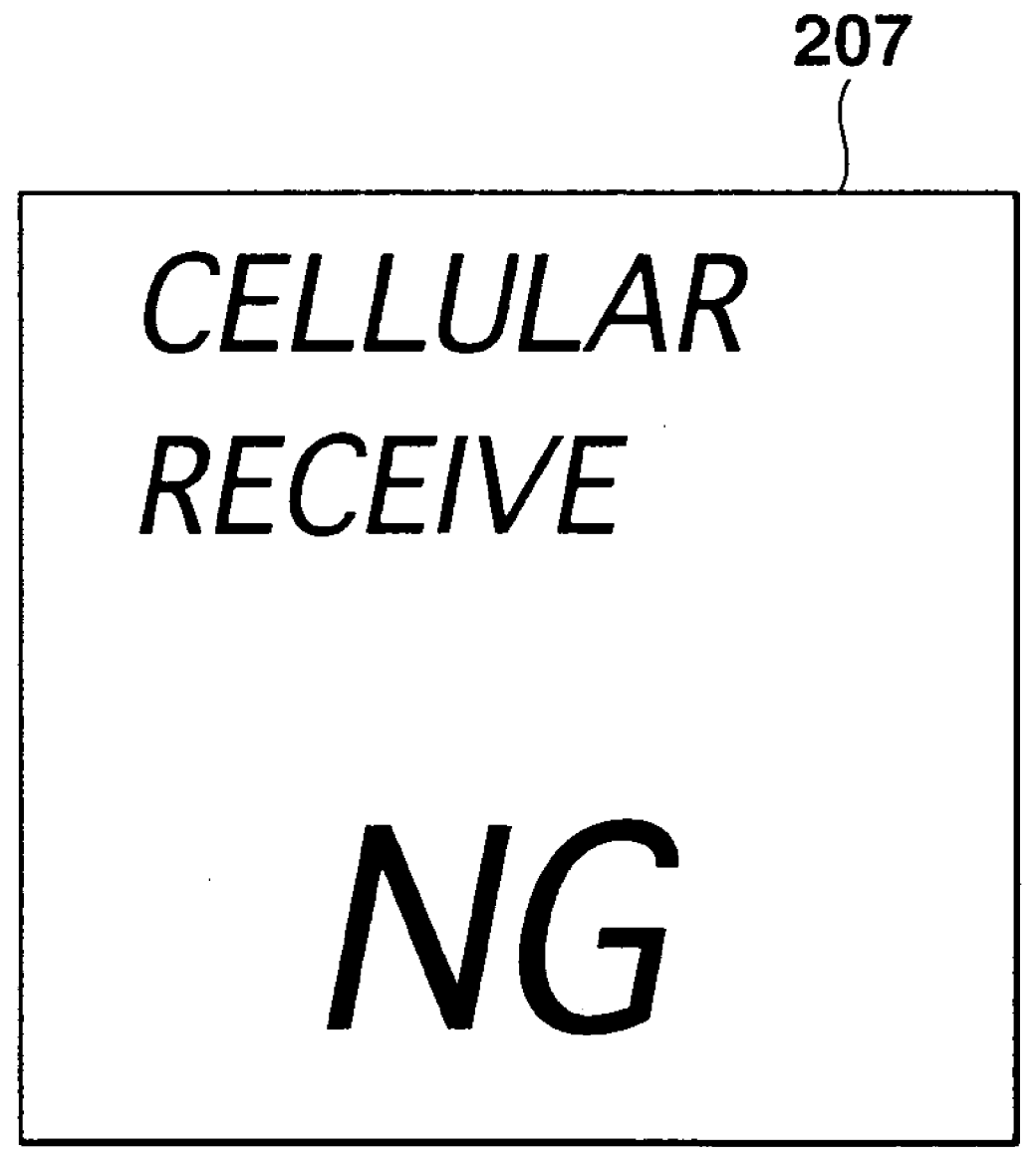
Figure 20:
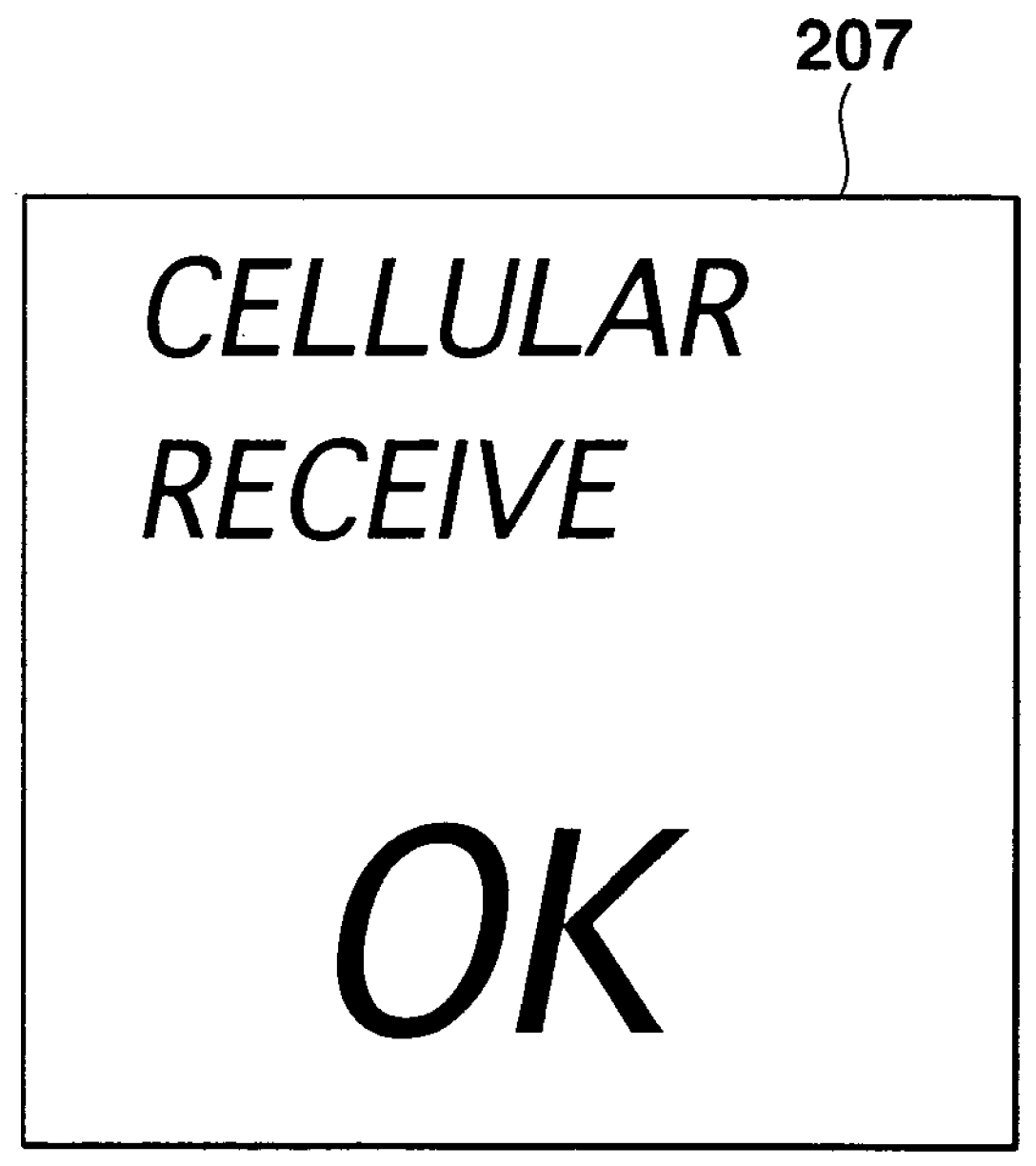

Then, when the reception of data is detected, it is judged whether the relevant received data is RGB data (step W12), and when it is not RGB data, "CELLULAR RECEIVE NG" is displayed on the display section 207 as illustrated in FIG. 19 (step W13). Moreover, when received data is RGB data, "CELLULAR RECEIVE OK" is displayed on the display section 207 as illustrated in FIG. 20 and an acknowledgement signal is transmitted (step W14). Furthermore, received RGB data is stored to RAM 212 in batch, and the first image is displayed on the display section 207 (step W15).

Next, the operations of keys S1 to S5 and F0 are detected (step W16) to judge which one of the keys S1, S2, S4, and F0 is operated (step W17). When the key S3 is operated, the Ir communication mode, which is currently set, is released to end processing according to this flowchart. Moreover, when the key S1 or key S4 is operated, it is judged whether next data of an image, which is currently displayed on the display section 207, is present in the RAM 212 (step W18), and when next data is present therein, a next image is displayed on the display section 207 based on the relevant data (step W19). Accordingly, the key S1 or key S4 is operated, thereby performing transmission to the digital camera 2 from the cellular phone terminal 4 via the attachment 3 to make it possible to display the image stored in the RAM 212 of the digital camera 2 on the display section 207 to confirm it. Then, when there is no data to be displayed next as a result of judgment in step W18, "NO DATA" is displayed on the display section 207 (step W20).

Moreover, when the operated key is the shutter key F0 as a result of judgment in step W17, image data of the image displayed on the display section 207 is stored in the storage memory 216 (step W21). Accordingly, the user of the digital camera 2 causes the display section 207 to display the images transmitted to the digital camera 2 from the cellular phone terminal 4 via the attachment 3, sequentially as mentioned above, and operates the shutter key F0 at the time when an arbitrary image is displayed, thereby making it possible to store only an arbitrary image to the storage memory 216.

Figure 14:
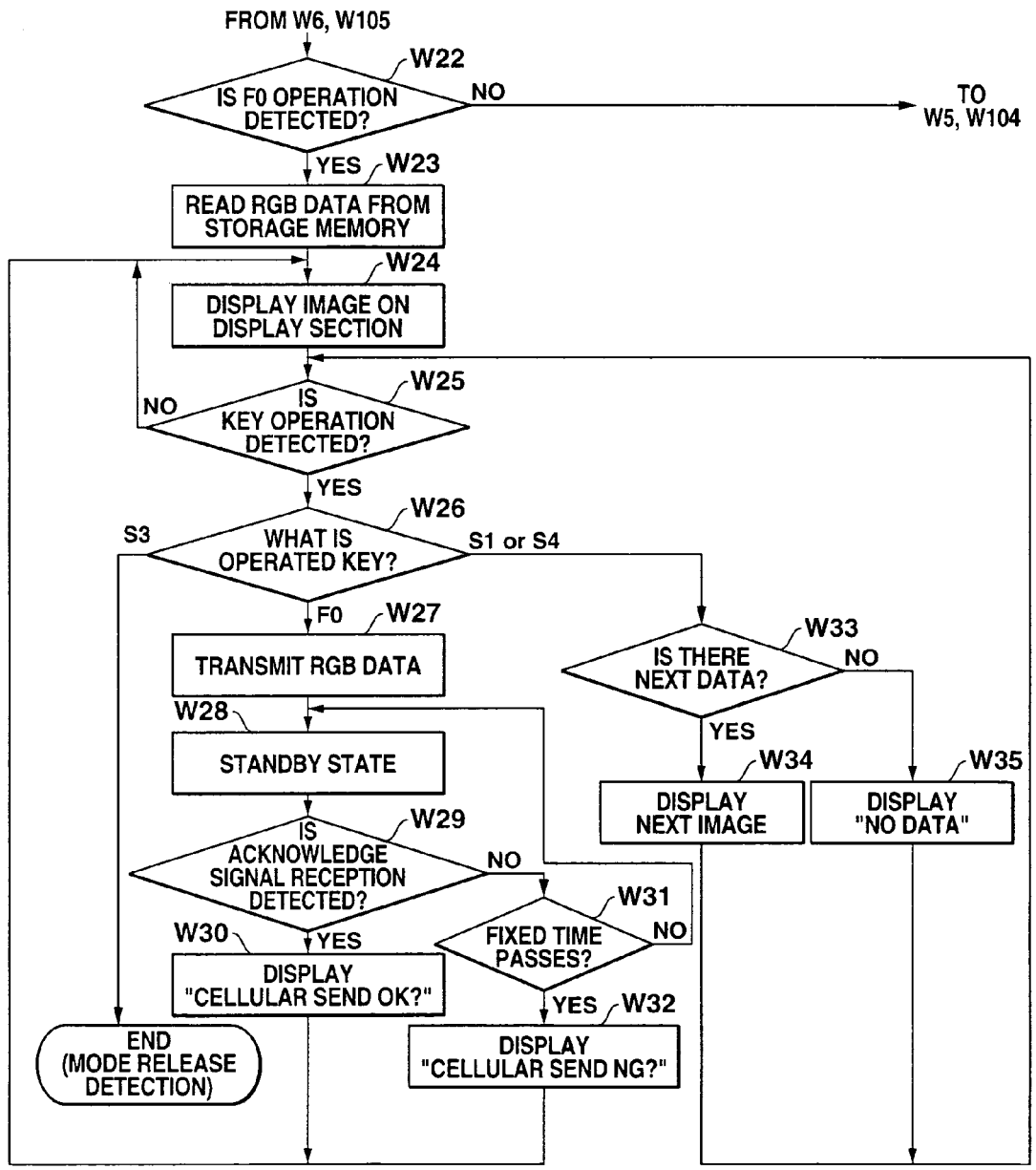
FIG. 14 is a flowchart subsequent to step w6 of FIG. 13 or step W105 of FIG. 20.

While, when neither the key S1 nor S4 is operated as a result of judgment in step W6, the processing flow proceeds to step W22 in FIG. 14 to judge whether the operation of shutter key F0 is detected, and when the operation of shutter key F0 is not detected, the processing flow proceeds to step W5. However, when the operation of shutter key F0 is detected, RGB data is read from the storage memory 216 (step W23), image, which is based on this RGB data, is displayed on the display section 207 (step W24).

Furthermore, the operations of keys S1 to S5 and F0 are detected (step W25) to judge which one of the keys S1, S3, S4, and F0 is operated (step W26). When the key S3 is operated, the Ir communication mode, which is currently set, is released to end processing according to this flowchart. Moreover, when the key S1 or key S4 is operated, it is judged whether next data of an image, which is currently displayed on the display section 207, is present in the storage memory 216 (step W33), and when next data is present therein, a next image is displayed on the display section 207 based on the relevant data (step W34).

In other words, the user of the digital camera 2 performs image-forming using the color camera module 218 by the operation of the shutter F0 to store image data in the storage memory 216 in advance. Then, the key S1 or key S4 is operated at the time of transmitting image data to the cellular phone terminal 4 from the digital camera 2 via the attachment 3. Accordingly, the image, which is based on the image data stored in the storage memory 216, is displayed on the display section 207, and the image to be transmitted can be confirmed. Then, when there is no data to be displayed next as a result of judgment in step W33, "NO DATA" is displayed on the display section 207 (step W35).

Figure 21:
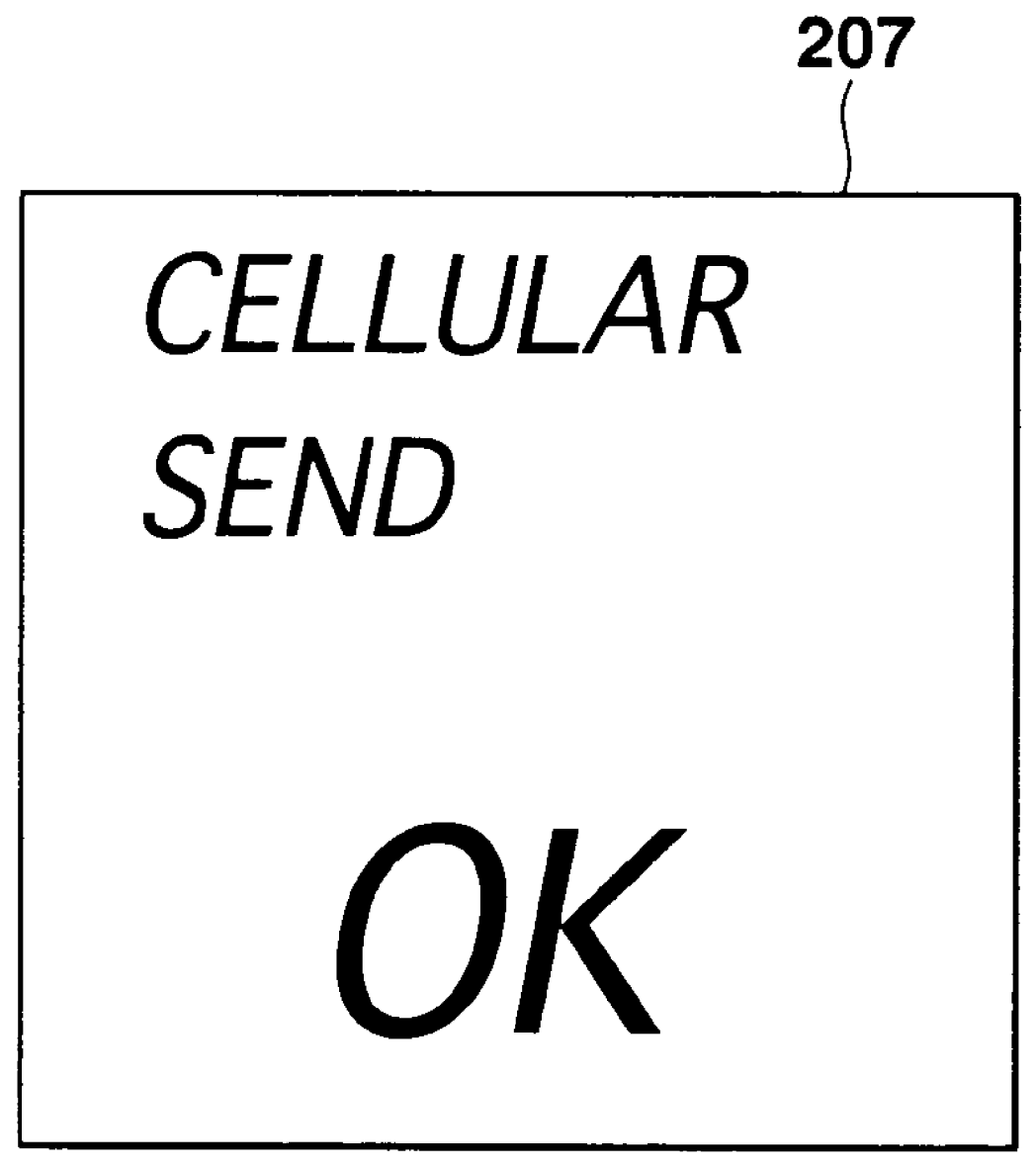
Figure 22:
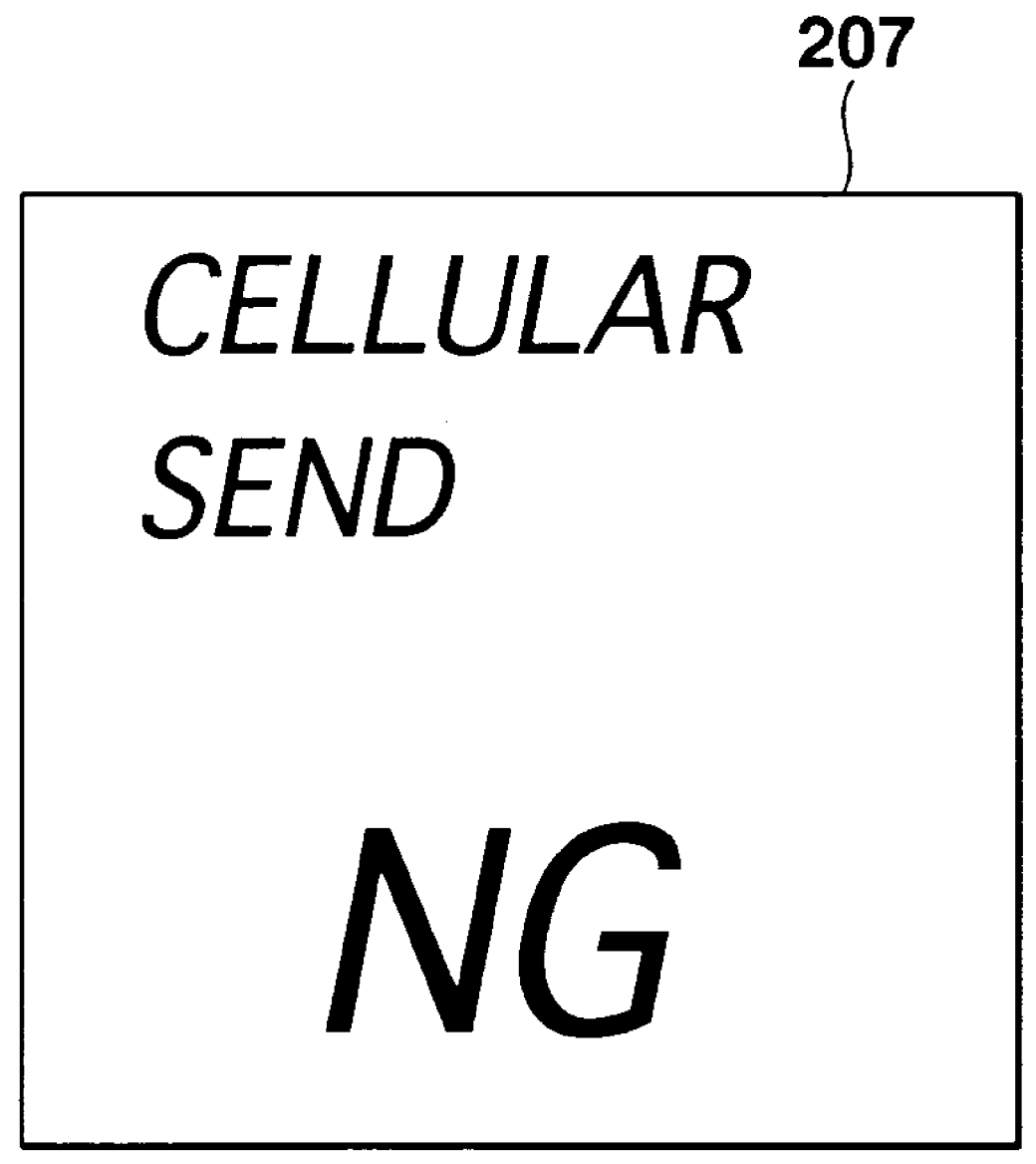

Moreover, when the operated key is the shutter key F0 as a result of judgment in step W26, RGM data of the image displayed on the display section 207 is transmitted to the attachment 3 by the Ir module 215 (step W27), thereafter entering a standby state (step W28). Then, it is judged whether the reception of an acknowledgement signal from the attachment 3 is detected (step W29), and when the reception of the acknowledgement signal is detected, "CELLULAR SEND OK" is displayed on the display section 207 as shown in FIG. 21 (step W30), and processing from step W24 is repeated. Further, when the reception of the acknowledgement signal is not detected, the standby state is maintained until a fixed time passes (step W31), "CELLULAR SEND NG" is displayed on the display section 207 as shown in FIG. 22 at the time when the fixed time passes (step W32), thereafter processing from step W24 is repeated.

Figure 23:
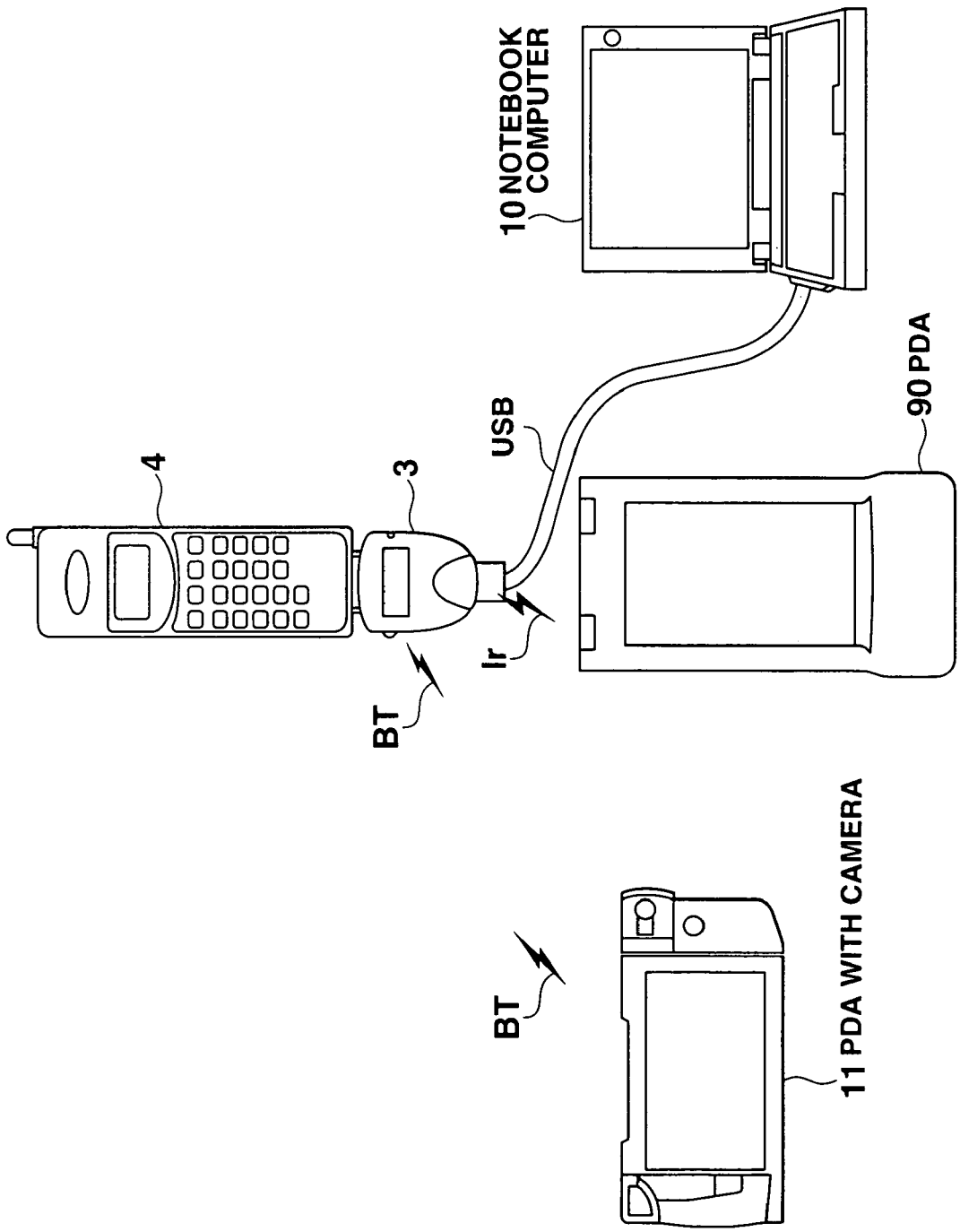
FIG. 23 is a system configuration view illustrating a modification of the first embodiment.

Additionally, the present embodiment has explained that transmission/reception of image data is performed between the attachment 3 and the digital camera 2 by the infrared ray, however, as illustrated in FIG. 23, processing is executed according to the aforementioned flowchart, making it possible to perform transmission/reception of image data between the attachment 3 and a PDA 90 having an infrared communication function, between the attachment and a USB-connected notebook computer 10, and between the attachment 3 and a short-range radio-connected PDA 11 with a camera.

Second Embodiment

FIGS. 24 to 31 illustrate a second embodiment of the present invention, and the same reference numerals as those of the first embodiment are added to the same functional components as those of the first embodiment, and the explanation will be omitted.

(Structure of System)

Figure 24:
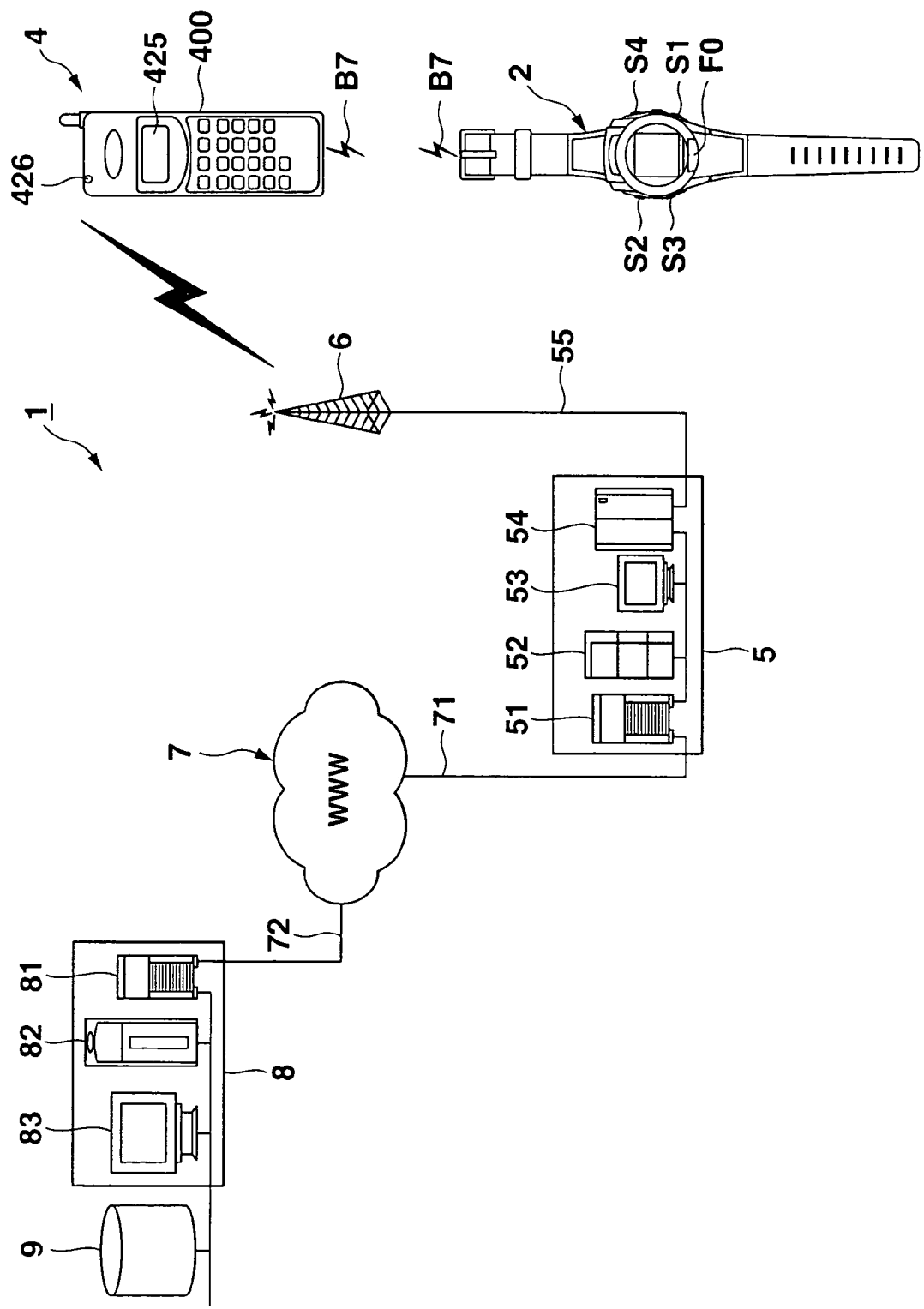
FIG. 24 is a view illustrating the system configuration of a second embodiment of the present invention.

As illustrated in FIG. 24, the image data transmission/reception system 1 of the second embodiment is composed of the digital camera 2, a cellular phone terminal 400 connected to the digital camera 2 by the short-range radio communication (Bluetooth system) BT, the communication service carrier 5, and the service provider 8 connected to the communication service carrier 5 via the WWW (World Wide Web) 7. The communication service carrier 5 includes the exchanger 54 connected to the radio base station 6 via the communication line 55, the monitor 53, the client management server 52, and the WWW connection server 51 connected to the WWW 7 via a communication line 72. The service provider 8 includes the WWW server 81, which is connected to the WWW 7 via the communication line 72, the server 52 for service provider, and the monitor 83, and is connected to the database 9 that stores image data which the service user (client) uploads through WWW.

Then, in the present embodiment, there is considered a case in which image data, which is image-formed by the digital camera 2 and stored in advance, is uploaded (stored) to the database 9 via the cellular phone terminal 400, the radio base station 6, the radio base station 6, the communication service carrier 5, the WWW 7, and the service provider 8, or inversely, image data stored in the database 9 is downloaded (transmitted, stored) to the service provider 8, the WWW 7, the communication service carrier 5, the radio base station 6, the cellular phone terminal 400 and the digital camera 2.

(Structure of Cellular Phone Terminal)

FIG. 25 is a block diagram illustrating a circuit structure of the cellular phone terminal 400. As illustrated in the same figure, this is the same circuit as the circuit the known cellular phone terminal has, and the CPU 405 connected to the bus 404 is provided. Moreover, the transmitting and receiving section 406, the communication processing section 407, the program memory 408, the timer section 409, the display I/F section 410, the driver 411, the RAM 315, a sub CPU 323, an UIM card 4120, the data memory 413, the connector 414, the operation input section 415, the speech decode/code processing section 416, a ROM 324, and the Ir communication section (Ir filter) 305 of the Ir communication module 309 are connected to the bus 404.

The transmitting/receiving section 406 includes an antenna 417, which transmits and receives a radio wave where a digital signal is overlapped between the radio base station 6 and the section 406 in a signal modulation/demodulation system such as CDMA, TDMA fixed by the communication service carrier 5, the received digital signal is sent to a low noise amplifier 451 via a transmission/reception sharing unit 418, modulated by a demodulating section 419, which operates when a signal is sent from a synthesizer 421, and subjected to equalization processing by an equalizer 420, and the resultant is sent to the communication processing section 407 that performs channel coding/decoding processing. The digital signal coded by the communication processing section 407 is modulated by a modulating section 422, which operates when a signal is sent from the synthesizer 421, and amplified by a power amplifying section 423, and radiated from the antenna 417 via the transmission/reception sharing unit 418.

The program memory 408 includes ROM having an area where an application/software, an upper layer protocol, and driver soft ware are stored, and the CPU 405 and the sub CPU 323 control each circuit section based on various programs stored in the program memory 408. Moreover, the time counter 409 counts current time. The display I/F 410 is connected to the display section 425 having a dot-matrix type color LCD via the display driver 424, and the display section 425 is provided on the front surface of the main body of the cellular phone terminal 4. Then, the display driver 424 drives the display section 425 under control of the CPU 405, thereby displaying characters that form various information and mail, and connection to WWW 7 via the communication service carrier 5 makes it possible to browse the Internet site and display image data transferred from the digital camera 2. The driver 411 drives an LED 426 under control of the main CPU 405 and the sub CPU 323, and the LED 426 is provided at a predetermined location of the main body of the cellular phone terminal 400. Additionally, in the present embodiment, the LED 426 is a multi-color LED.

The Bluetooth antenna 311 for performing short-range radio communication with the digital camera 2 is connected to the radio processing section 316. The UIM card 412, which stores subscriber information such as a terminal ID of the relevant cellular phone terminal 400, is attached to the UIM card connector 4120 to be attachable and detachable. The data memory 413 is RAM that stores various kinds of data such as memory dial information having a plurality of caller names and telephone numbers, and received data and the like, and is used as a work area for CPU 405. The connector 414 is structured to be connectable to the attachment 3 illustrated in the first embodiment, and the operation input section 415 has keys that are arranged at the front surface of the main body. The speech decode/code processing section 416 is a speech codec to which the vibrator motor 427, the speaker 428, and the microphone 429 are connected. The vibrator motor 427 rotates in synchronization with a ring tone decoded by the speech decode/code processing section 416 to generate vibration in a case where the speaker 428 is in an off state. The speaker 428 reproduces the ring tone decoded by the speech decode/code processing section 416 and received sound, and the microphone detects the input speech and inputs it to the speech decode/code processing section 416, and the input speech signal is coded by the speech decode/code processing section 416. In the ROM 324, various data illustrated in FIG. 24 to be described later is stored. The ROM 324 is one that can perform rewriting under a certain voltage condition as in a Flash ROM, and is thereby structured to attain an upgrade due to downloading and the like.

Additionally, in the present embodiment, the main CPU 405 and the sub CPU 323 are provided but only one CPU may be structured. Moreover, in the RAM 315, the application program storage area 3152, image data storage area 3153, and the work memory area 3154, which are the same as those of the first embodiment illustrated in FIG. 6, are provided.

FIG. 26 is a conceptual view illustrating the storage contents of the ROM 24, and areas 3140, 3241, 3242, 3144 to 3147, 3248 to 3250, and 3151 are provided therein. The area 3140 is a device ID memory, and stores a product ID and a manufacturer ID of the relevant cellular phone terminal 400, which are necessary to establish short-range radio communication link with the cellular phone terminal 400. In the area 3241, there is stored a conversion application program for mutually converting data between a JPEG file, which is image data image-formed by the digital camera 2, and a GIF file, in the area 3242, there is stored a conversion application program for mutually converting data between the JPEG file and a PNG file.

Moreover, in the area 3144, there is stored an Ir communication driver/IrMC☐ IrDA standards (software), in the area 3145, there is stored an Ir communication driver/other support (software), in the area 3146, there is stored a USB communication driver (software), and in the area 3147, there is stored a short-range radio communication (Bluetooth system) driver (software).

Further, in areas 3248 to 3250, protocol setting data 1 to 3 for cellular phone data communication are respectively stored. These protocol setting data items 1 to 3 are selected according to the communication environment of the communication partner with communication is performed via the cellular phone terminal 400, transmission/reception section 406, and the antenna 417. For example, in the case of data communication with the cellular phone terminal to which the same communication service carrier, the communication protocol that is permitted by the communication service carrier is selected, and in the case of communication with the personal computer connected to the other network such as ISDN, LAN, and the like via the Internet, the data communication system, which is adopted by this network or the communication protocol, which is adopted by the personal computer (modem, LAN, and the like) of the data communication destination, is selected. In other words, at the time when the cellular phone terminal 400 transmits and receives image data and the like, the communication protocol is automatically selected according to the network environment and the device of the transmission partner destination, and is desirably selected by a domain and URL included in a mail address as a selection method. In the area 3151, there are stored, for example, an application program for text conversion and an application program for PIM (personal information management) other than the conversion application program for various data (image data in the present embodiment).

Additionally, the area 3151 is not limited to the aforementioned application program for data conversion, and various kinds of application programs can be stored according to the specification and the kind of the outer peripheral device that performs communication.

For example, if the peripheral device has a GPS function, such the application program that converts positioning data to data format corresponding to the communication service carrier may be stored, if the peripheral device has a function that measures surrounding environments (temperature, pressure, luminance, noise) and information relating to a human body (pulse, steps), such the application program that converts these measuring data to data format corresponding to the communication service carrier may be stored. Furthermore, these application programs are desirably described by Java (registered trademark) Script that is downloadable by the service provider via WWW 7.

(Structure of Digital Camera)

The outline structure of the digital camera 2 in the present embodiment is the same as that of the first embodiment as illustrated in FIG. 8.

Figure 27:
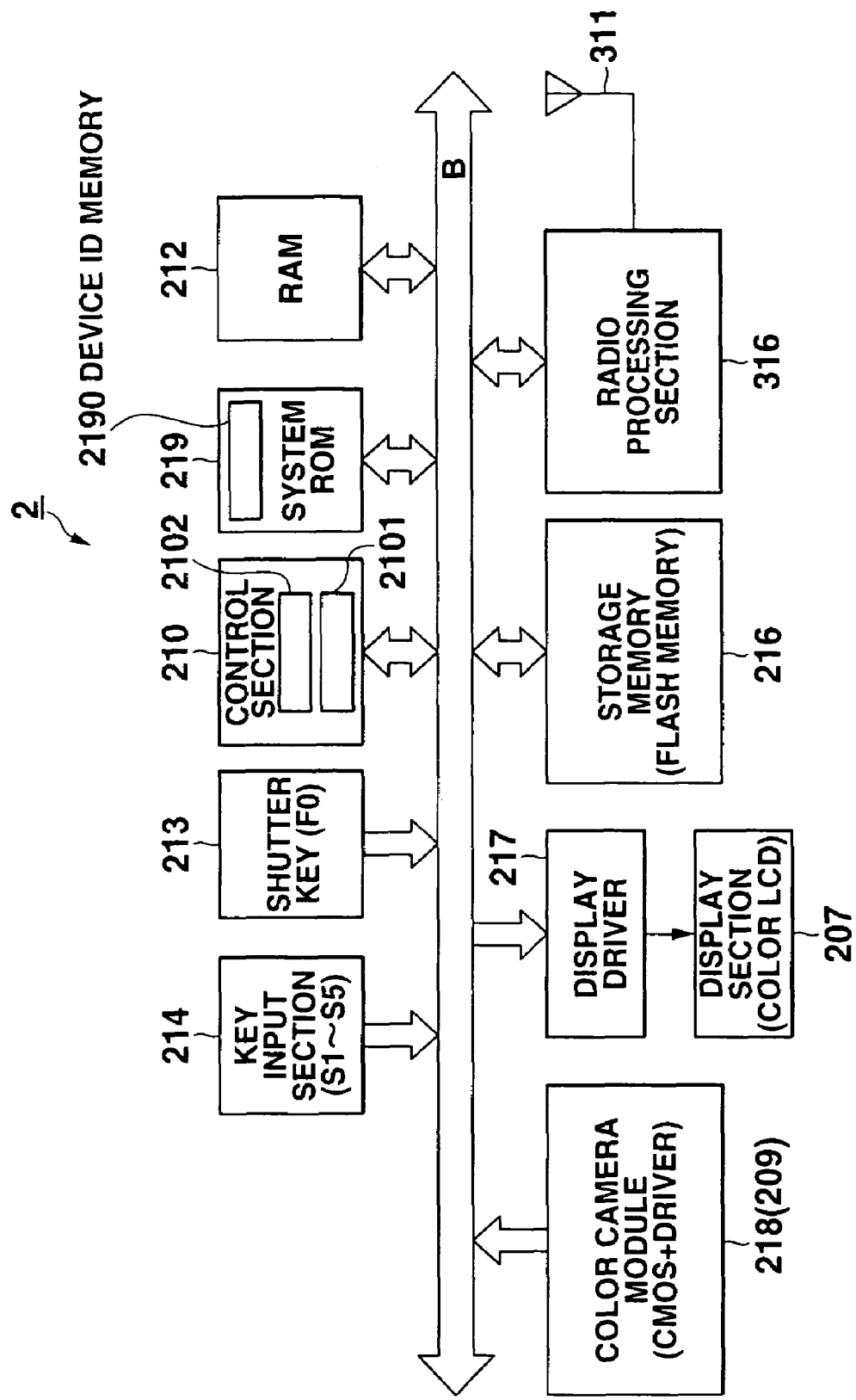
FIG. 27 is a block diagram illustrating the circuit structure of the digital camera according to the second embodiment.

FIG. 27 is a block diagram illustrating the circuit structure of the digital camera 2. As illustrated in the figure, a system ROM 219, the RAM 212, the storage memory (flash memory) 216, the display driver 217, the shutter key input block 213, which inputs a signal from the shutter key F0, the key input block 214, which inputs a signal from the key input sections S1 to S5, the color camera module 218 having the lens unit 209, and the radio processing section 316 are connected to the control section 210 via the bus B.

The control section 210 is one that controls each section by operating the RAM 212 as a working area according to the program stored in the system ROM 219, and has a clock generating section 2101 and a timer circuit 2102. The system ROM 219 stores the aforementioned program, and has a device ID memory 2190, which stores ID of the cellular phone terminal 400 as a communication partner, built-in. The display driver 217 is one that drives the display section 207. The color camera module 218 is one that can perform color-image forming, and includes the lens unit 209, CMOS, and the driver. The storage memory 216 includes a flash memory, and stores color image data (RGB format) of an object image-formed using the color camera module 218 by the operation of the shutter key F0 in JPEG file format.

The Bluetooth antenna 311 for performing short-range radio communication (Bluetooth system) with the cellular phone terminal 400 is connected to the radio processing section 316, and transmits color image data (JPEG file format) stored in the storage memory 216 to the cellular phone terminal 400.

The operation of the present embodiment will be next explained.

Figure 28:
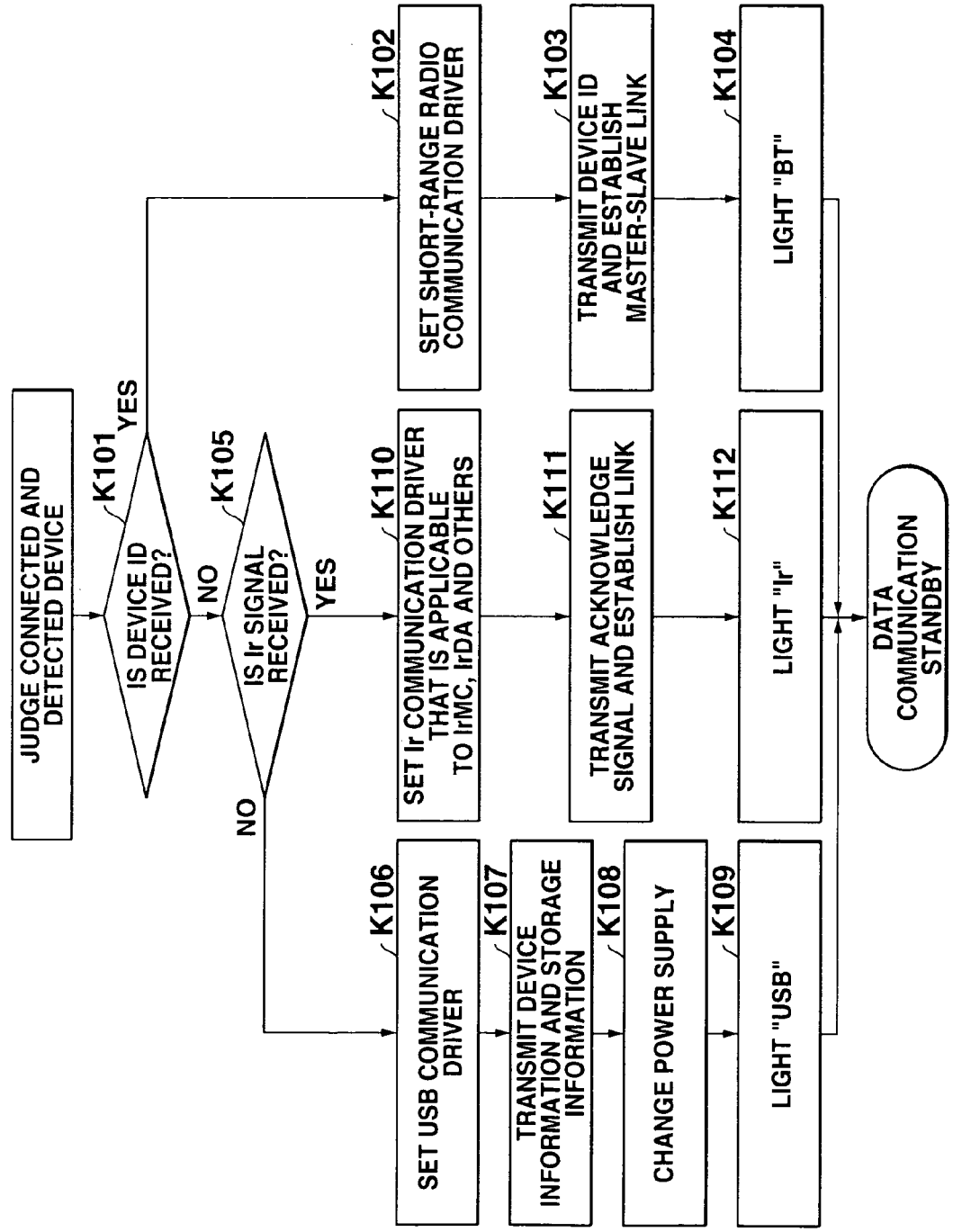
FIG. 28 is a flowchart illustrating processing steps of the cellular phone terminal according to the second embodiment.

FIG. 28 is a flowchart illustrating processing for judging the device that has detected a connection request when the cellular phone terminal 400 is in a standby state. Namely, the cellular phone terminal 400 judges whether the device ID is received from the outer device by the short-range radio communication (Bluetooth system) (step K101). When the device ID is received by the short-range radio communication, the short-range radio communication driver stored in the area 3147 of ROM 324 is set to the application data storage area 3152 of RAM 315 (step K102). Next, the device ID stored in the area 3140 of ROM 324 is transmitted and data exchange with the peripheral device of the communication destination as a slave to perform link establishment of the master-slave between the cellular phone terminal 400 and the short-range radio partner's device (step K103). Moreover, "BT" is lit (step K104), thereafter the state enters a data communication standby state.

When the device ID is received by the short-range radio communication as a result of judgment in step K101, it is judged whether an Ir signal is received (step K105). When the Ir signal is not received, namely, some device is connected to the connector 414, this is judged as USB connection to the outer device, and the USB communication driver stored in the area 3146 of ROM 324 is set to the application data storage area 3152 of RAM 315 (step K106). Moreover, device information and storage information of the relevant cellular phone terminal 400 are transmitted to the connected PC and the like (step K107), and power supply is changed to power to be supplied from the PC side of the connection destination through the connector (step K108). Moreover. "USB" is lit at the display section 425 (step K109) and the state enters a data communication standby state.

Moreover, when the Ir signal is received as a result of judgment in step K105, it is judged whether Ir communication driver/other support stored in the area 3145 of ROM 324 is set to the application data storage area 3152 of RAM 315 (step K110). Moreover, an acknowledgement signal is sent to the other end of communication and link is established (step K111). Moreover, "Ir" is lit at the display section 425 (step K112) and the state enters a data communication standby state.

Figure 29:
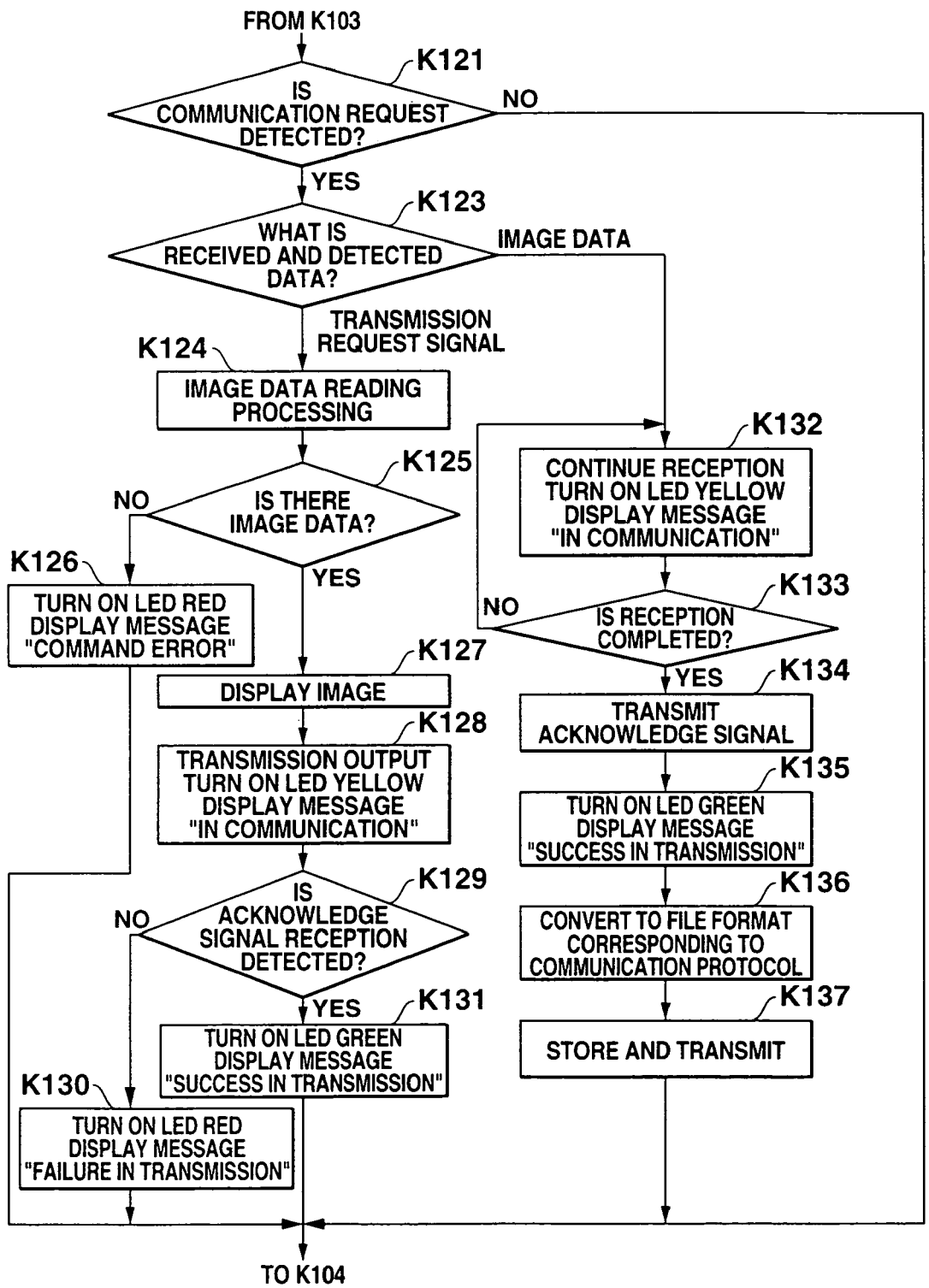
FIG. 29 is a flowchart subsequent to step K103 of FIG. 28.

FIG. 29 is a flowchart illustrating processing that is executed by the cellular phone terminal 400 subsequent to step K103 in a case where the device ID is received from the outer device (digital camera 2) by the short-range radio communication as a result of judgment in step K101 in a state that the mail function is started prior to the transmission and reception of image data and transmission is automatically performed by the selection of the mail address and URL or the communication protocol of the transfer destination More specifically, it is judged whether a transmission request from the digital camera 2 is detected (step K121) and when it is not detected, the processing flow proceeds to step K104 and the state becomes a standby state, and when it is detected, judgment on whether image data is relieved and whether it is a transmission request signal of image data based on the data protocol (Bluetooth system) is sequentially performed (step K123). When it is the transmission request signal, processing for reading image data from the image data storage area 3153 is performed (step K124), and it is judged whether image data is present (step K125). When image data is not stored in the image data storage area 3153, the LED 426 is caused to emit red light and a message "command error" is displayed on the display section 425 (step K126).

Moreover, when image data is stored in the image data storage area 3153, this is displayed on the display section 425 (step K127). Further, this image data is transmitted and output to the digital camera 2 from the radio processing section 316 via the antenna 311 to cause the LED 426 to emit yellow light and to display a message "in transmission" on the display section 425 (step K128). Next, it is judged whether the reception of the acknowledgement signal sent from the digital camera 2 in response thereto is detected (step K129). Then, when the acknowledgement signal is not received, the LED 426 is caused to emit red light and to display a message "failure in transmission" (step K130). When the acknowledgement signal is received, the LED 426 is caused to emit green light and to display a message "success in transmission" on the display section 425 (step K131).

Moreover, when the received and detected data is image data as a result of judgment in step K123, namely the image data with JPEG file format is transmitted from the digital camera 2, the LED 426 is caused to emit red light and a message "in reception" is displayed on the display section 425 (step K132). Further, it is judged whether the reception of image data is completed (step K133), and when it is completed, the acknowledgement signal is transmitted to the digital camera 2 (step K134). Next, the LED 426 is caused to emit green light and a message "success in reception" is displayed on the display section 425 (step K135). Sequentially, received image data is transmitted or converted to a file format corresponding to the communication protocol of the transfer destination (step K136), thereafter being stored to the image data storage area 3153 again and to transmit (step K137).

Figure 30:
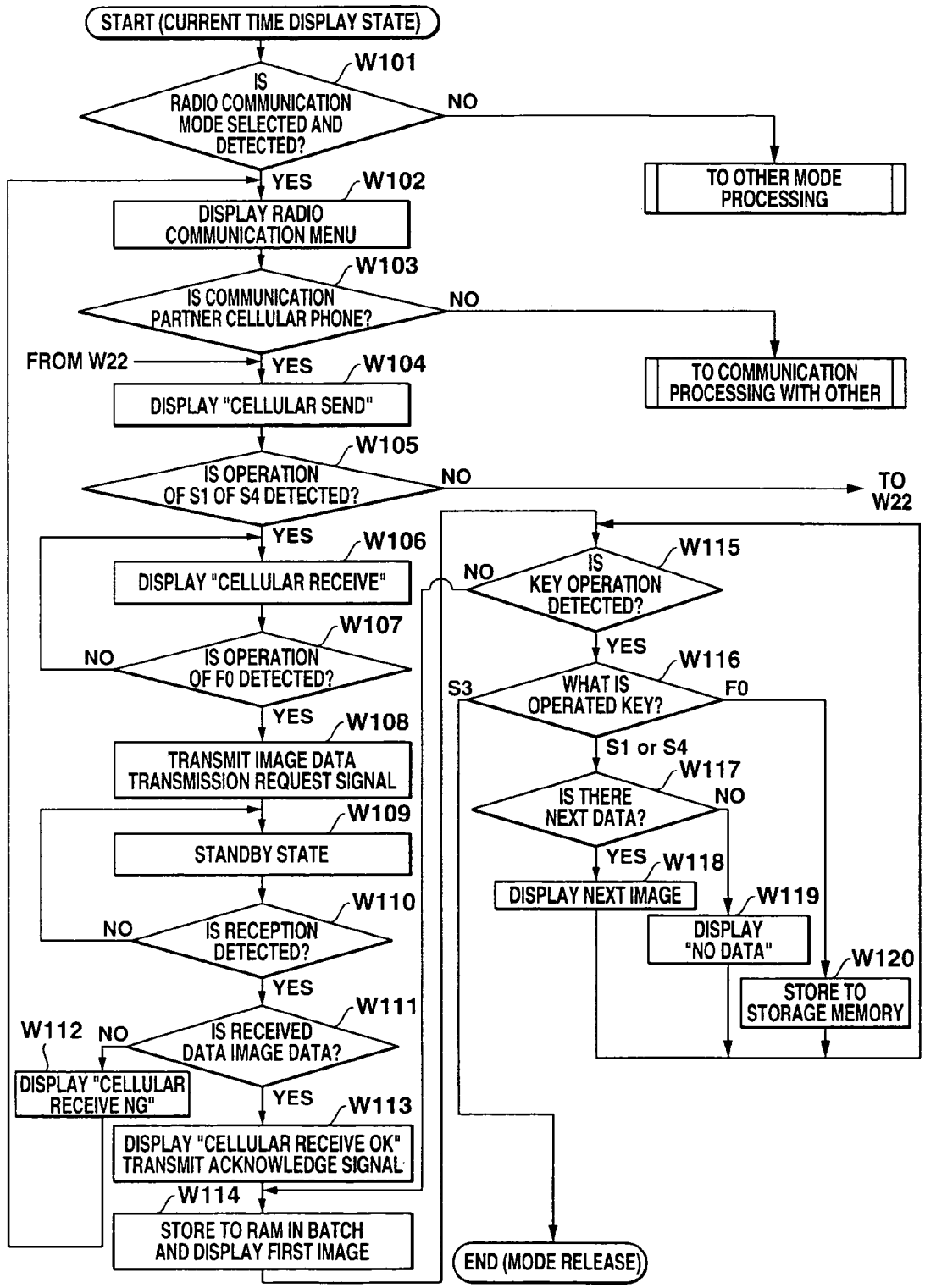
FIG. 30 is a flowchart illustrating the processing operation of the digital camera according to the second embodiment.

FIG. 30 is a flowchart illustrating the processing operation of the digital camera 2 corresponding to the flowchart of FIG. 29. The digital camera 2 performs a current time display on the display section 207 in a normal mode state. In this state, it is always detected whether the radio communication mode is selected by a predetermined operation to the keys S1 to S5 (step W101). Then, when the radio communication mode is selected, the time display is changed to perform radio communication menu display (step W102).

Figure 31:
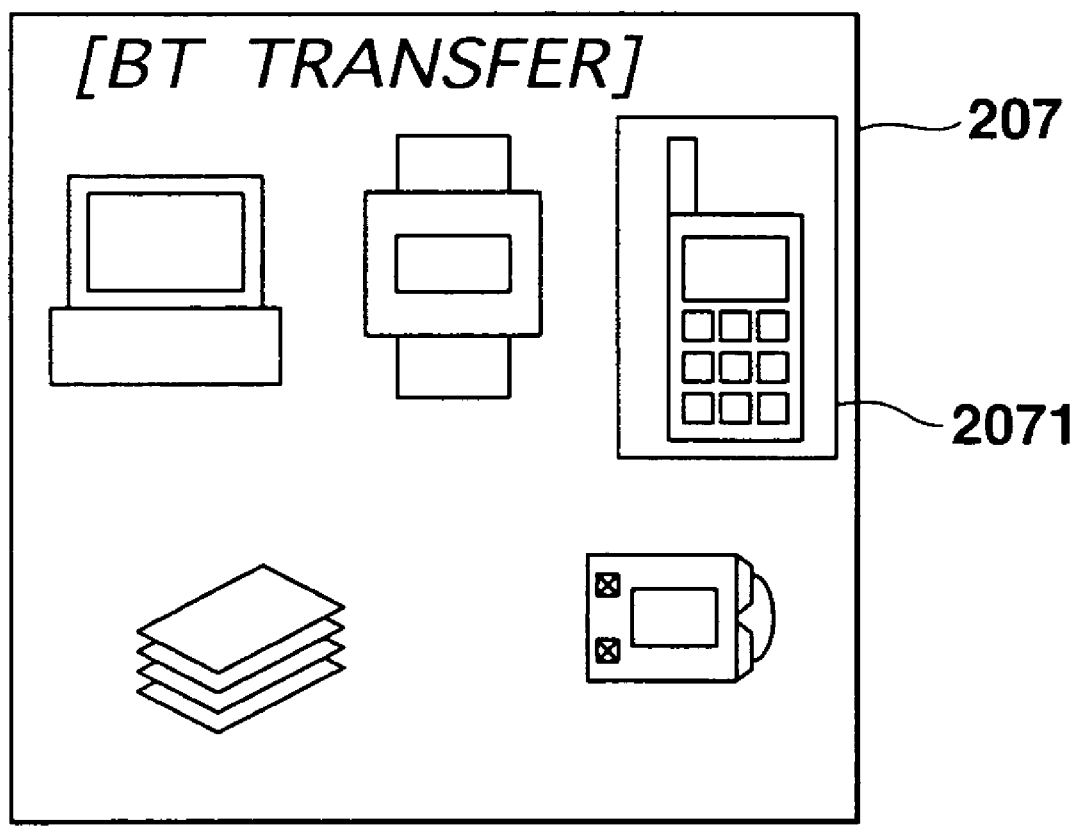
FIG. 31 is a view illustrating the display state of the display section of the digital camera according to the second embodiment.

FIG. 31 is a view illustrating the display state of the display section 207 of the digital camera 2 in step W102.

In this display state, "BT TRANSFER" indicating the short-range radio communication mode state is displayed on the upper portion of the display section 207, and each icon indicating the other end of communication is displayed at the lower portion.

In other words, there are displayed the respective icons "PC" (personal computer or infrared communication port connected to the personal computer), "digital camera" having the same specification as the digital camera 2, "cellular phone" from the upper left side, and "Other", which is the device such as other PDA and the like, and "portable game machine" from the lower left side; and the received device ID of the other end of communication is recognized, and a square frame 2071 that indicates the communication partner is automatically moved.

Thereafter, it is judged whether the communication destination is "cellular phone" from the display state in step W102 (step W103). When the communication destination is "cellular phone", "CELLULAR SEND" is displayed on the display section 207 as illustrated in FIG. 17 (step W104) to judge the key S1 or S4 is operated (step W105). When neither the key S1 nor S4 is operated, the processing flow proceeds to the aforementioned step W22 in FIG. 14.

When either the key S1 or S4 is operated, "CELLULAR RECEIVE" is displayed on the display section 207 as illustrated in FIG. 18 (step W106), thereafter detecting the presence or absence of the operation to the shutter key F0 (step W107). When the operation to the shutter key F0 is detected, a transmission request signal of image data is transmitted to the cellular phone terminal 400 (step W108), thereafter entering the standby state (step W109), and the standby state is continued until the reception of data is detected (step W110).

Then, when the reception of data is detected, it is judged whether the relevant received data is image data (JPEG format file) (step W111), and when it is not image data, "CELLULAR RECEIVE NG" is displayed on the display section 207 as illustrated in FIG. 19 (step W112). Moreover, when received data is image data, "CELLULAR RECEIVE OK" is displayed on the display section 207 as illustrated in FIG. 20 and an acknowledgement signal is transmitted (step W113). Furthermore, received image data is stored to RAM 212 in batch, and the first image is displayed on the display section 207 (step W114). Next, the operations of keys S1 to S5 and F0 are detected (step W115) to judge which one of the keys S1, S2, S4, and F0 is operated (step W116). When the key S3 is operated, the short-range radio communication mode, which is currently set, is released to end processing according to this flowchart. Moreover, when the key S1 or key S4 is operated, it is judged whether next data of an image, which is currently displayed on the display section 207, is present in the RAM 212 (step W117), and when next data is present therein, a next image is displayed on the display section 207 based on the relevant data (step W118). Accordingly, the key S1 or key S4 is operated, thereby performing transmission to the digital camera 2 from the cellular phone terminal 400 via the cellular phone terminal 400 to make it possible to display the image stored in the RAM 212 of the digital camera 2 on the display section 207 to confirm it. Then, when there is no data to be displayed next as a result of judgment in step W117, "NO DATA" is displayed on the display section 207 (step W119).

Moreover, when the operated key is the shutter key F0 as a result of judgment in step W116, image data of the image displayed on the display section 207 is stored in the storage memory 216 (step W120). Accordingly, the user of the digital camera 2 causes the display section 207 to display the images transmitted to the digital camera 2 from the cellular phone terminal 400 via the cellular phone terminal 400, sequentially as mentioned above, and operates the shutter key F0 at the time when an arbitrary image is displayed, thereby making it possible to store only an arbitrary image to the storage memory 216.

While, when neither the key S1 nor S4 is operated as a result of judgment in step W105, the processing flow proceeds to step W22 in FIG. 14 and processing in the aforementioned steps W22 to W35 is executed similar to the first embodiment.

Additionally, in the present embodiment, the relationship between the cellular telephone terminal 400 as a master and the digital camera 2 as a slave is established, but the inverse relationship may be possible.

Moreover, according to the present embodiments, either case has illustrated the case in which Bluetooth system is used as the short-range radio communication system, but various kinds of standards, which implement the so-called high-speed radio LAN, may be, for example, IEEE 802. 11a, IEEE 802. 11b, and IEEE 802. 11g, and it is needless to say that they may be suitably changeable.

As explained above, according to the present invention, the connection unit is connected to the connector of the portable radio communication device, thereby the communication protocol of the relevant portable radio communication device is judged and data received from the outer section is converted to the format along the communication protocol of the judged relevant portable radio communication device. Accordingly, even if the portable radio communication device to which the connection unit is connected uses any communication protocol, this can be generally used. This makes it possible to convert data received from the outer section to the format along the communication protocol of the connected portable radio communication device and to upload it to the server on the WWW from the relevant portable radio communication device.

Moreover, according to the present invention, the connection unit connected to the connector of the portable radio communication device judges the data communication system at the time of transmitting data to the partner's device from the portable radio communication device, and converts data received from the portable radio communication device via the connector to the format along the judged data communication system. Accordingly, even if any communication system is used between the portable radio communication device and the partner's device that transmits data, this can be generally used. This makes it possible to transmit data to arbitrary outer device from the relevant portable radio communication device after the portable radio communication device downloads data from the server on the WWW.

Further, since a radio communication module, a cable communication module, and an optical commutation module are provided to the connection unit, which is attachably and detachably connected to the connector provided in the portable radio communication device, the present invention can deal with the radio communication, cable communication, and optical communication and ensure general versatility to the communication system.

Furthermore, according to the present invention, in the radio communication system having the portable radio communication device and the outer device, since data communication system is judged at the time when the portable radio communication device receives data from the outer device and received data is converted to the format along the judged data communication system, even if any communication system is used between the portable radio communication device and the outer device that transmits data, this can be used for general purpose to carry out data transmission and reception.

INDUSTRIAL APPLICABILITY

The present invention can be used to the industrial filed such as electronic device, radio communication and the like.

The invention claimed is:

1. A connection unit, which is connected to a connector being attachably and detachably provided in a portable radio communication device, and which includes a plurality of kinds of data communication devices for performing data communication with an outer section of the portable radio communication device, comprising:
   receiving means for receiving data from the portable radio communication device via the connector;
   conversion program storing means for storing a plurality of programs for converting data in accordance with the data communication device with said portable radio communication device;
   detecting means for detecting reception of data in any of said plurality of data communication devices;
   judging means for judging a data communication protocol with the outer section of the portable radio communication device based on the kind of the data communication device detected by said detecting means;
   reading means for reading a corresponding program by said conversion program storing means based on the data communication protocol judged by said judging means;
   converting means for converting data received by said receiving means to a format along the data communication protocol judged by said judging means, by executing the program read by said reading means; and
   supplying means for supplying the data converted by said converting means to the outer section of said portable radio communication device via the data communication device detected by said detecting means.

2. The connection unit according to claim 1, further comprising:
   alarming means for alarming a data communication state with said portable radio communication device, and/or a data communication state with the outer section of said portable radio communication device.

3. The connection unit according to claim 1, wherein said data is image data.

4. The connection unit according to claim 1, wherein said plurality of kinds of data communication devices are short-range radio communication modules for performing data communication with the outer section of said portable radio communication device by close radio commutation, and cable communication modules for performing data communication with the outer section of said portable radio communication device by cable commutation.

5. The connection unit according to claim 1, wherein said plurality of data communication devices are optical communication modules for performing data communication with the outer section of said portable radio communication device by optical commutation, and cable communication modules for performing data communication with the outer section of said portable radio communication device by cable commutation.

6. The connection unit according to claim 1, wherein said plurality of kinds of data communication devices are: short-range radio communication modules for performing data communication with the outer section of said portable radio communication device by close radio commutation;
   optical communication modules for performing data communication with the outer section of said portable radio communication device by optical commutation; and
   cable communication modules for performing data communication with the outer section of said portable radio communication device by cable commutation.

7. The connection unit according to claim 1, further comprising: alarming means for alarming a data communication state with the portable radio communication device.

8. A radio communication system having a portable radio communication device and an outer device, said portable radio communication device comprising:
   plural kinds of data communication devices for performing data communication with said outer device;
   detecting means for detecting a connection request from said outer device in any of said plural kinds of data communication devices;
   judging means for judging a data communication protocol with said outer device based on in which of said data communication devices the connection request detected by said detecting means is detected; and
   communication means for performing data communication with said outer device by the data communication protocol judged by said judging means.

9. The radio communication system according to claim 8 wherein said portable radio communication device further comprises alarming means for alarming a data communication state with said outer device.

10. The radio communication system according to claim 8, wherein said outer device comprises image forming means and said data is image data image-formed by said image forming means.

11. The radio communication system according to claim 8, wherein said portable radio communication device is connected to a WWW connection server via a WWW (World Wide Web), and image data stored in said portable radio communication device is stored in a database connected to said server or image data stored in the database is transmitted and stored to said portable radio communication device via the WWW.

12. A control method of a connection unit, which is connected to a connector being attachably and detachably provided in a portable radio communication device and which includes a plurality of kinds of data communication devices for performing data communication with an outer section of the portable radio communication device, comprising:
- a detecting step of detecting reception of data in any of said plurality of data communication devices;
- a judging step of judging a data communication protocol with the outer section of the portable radio communication device based on the kind of data communication device detected during said detecting step;
- a receiving step of receiving image data from the portable radio communication device via the connector;
- a converting step of converting image data received during said receiving step to a format along the data communication system judged by said judging step; and
- a supplying step of supplying the image data converted during said converting step to the outer section of the portable radio communication device via the data communication device detected during said detecting step.

13. A radio communication method of performing radio communication between a portable radio communication device including a plurality of kinds of data communication devices for performing data communication with an outer device and said outer device, comprising:
- a detecting step of detecting reception of data from said outer device in any of said plurality of kinds of data communication devices;
- a judging step of judging a data communication protocol with said outer device by the kind of the data communication device detected during said detecting step; and
- a communication step of performing data communication with said outer device by the data communication protocol judged during said judging step.

14. The radio communication method according to claim 13, further comprising an alarming step of alarming a data communication state with said outer device.

15. The radio communication method according to claim 13, wherein said outer device is an image forming device, and the data is image-found image data.

* * * * *

UNITED STATES PATENT AND TRADEMARK OFFICE
CERTIFICATE OF CORRECTION

PATENT NO. : 7,209,768 B2 Page 1 of 1
APPLICATION NO. : 10/471298
DATED : April 24, 2007
INVENTOR(S) : Takaomi Yonekura et al.

It is certified that error appears in the above-identified patent and that said Letters Patent is hereby corrected as shown below:

Under column 25, line 6 (claim 11, line 2);

change "8" to --10--.

Signed and Sealed this

Fifth Day of August, 2008

JON W. DUDAS
*Director of the United States Patent and Trademark Office*